United States Patent [19]

Nordsieck et al.

[11] Patent Number: 5,742,753
[45] Date of Patent: Apr. 21, 1998

[54] MESH INTERCONNECTED ARRAY IN A FAULT-TOLERANT COMPUTER SYSTEM

[75] Inventors: Arnold W. Nordsieck, Bellevue; Christopher A. Young, Redmond; William M. Yost, Woodinville, all of Wash.

[73] Assignee: The Boeing Company, Seattle, Wash.

[21] Appl. No.: 660,601

[22] Filed: Jun. 6, 1996

[51] Int. Cl.⁶ .................................................. G06F 11/00
[52] U.S. Cl. ..................... 395/182.09; 395/185.1; 395/184.01; 395/182.22; 395/185.09
[58] Field of Search .................. 395/182.02, 182.08, 395/182.09, 182.1, 184.01, 185.1, 185.01, 182.22, 185.09; 371/21.2

[56] References Cited

U.S. PATENT DOCUMENTS

| | | | |
|---|---|---|---|
| 4,438,494 | 3/1984 | Budde et al. | 364/200 |
| 4,493,081 | 1/1985 | Schmidt | 395/185.07 |
| 4,503,534 | 3/1985 | Budde et al. | 364/200 |
| 4,503,535 | 3/1985 | Budde et al. | 364/200 |
| 4,570,261 | 2/1986 | Maher | 371/67 |
| 4,589,066 | 5/1986 | Lam et al. | 395/182.1 |
| 4,697,344 | 10/1987 | Scavezze et al. | 395/182.02 |
| 4,914,657 | 4/1990 | Walter et al. | 395/182.02 |
| 5,048,816 | 9/1991 | Boese et al. | 395/182.02 |
| 5,212,785 | 5/1993 | Powers et al. | 364/944.61 |
| 5,477,492 | 12/1995 | Ohsaki et al. | 371/21.2 |
| 5,517,616 | 5/1996 | Taylor, Jr. | 395/182.09 |

OTHER PUBLICATIONS

Intel Data Book, "16-/32-Bit Embedded Processors", Intel Corp., pp. 5-47-5-74, 1990.

Leong, R.M., Hartin, R.B., and Green, G.W., "Fault Detection and Reconfiguration Unit," National Semiconductor Corporation (Oct. 20, 1987).

Somani, A.K. and Sullam, B., "The Organization and Structure of a Bus Interface Unit for the UW-FTCL Highly Reliable Embedded Computer Architecture," University of Washington.

*Primary Examiner*—Robert W. Beausoliel, Jr.
*Assistant Examiner*—Joseph E. Palys
*Attorney, Agent, or Firm*—Christensen O'Connor Johnson & Kindness PLLC

[57] ABSTRACT

Bus interface units (BIUs)(54) perform fault detection, identification, and reconfiguration for all information transfers between redundant central processing units (CPUs)(56) and memory or input/output (I/O)(57A-C) in a mesh interconnected array of a highly reliable fault-tolerant computer system. Errors are detected by self-checking within the BIUs, signal parity checks by the BIUs, cross channel comparisons, and mesh transaction assessments. Fault identification and mesh reconfiguration for the mesh is performed such that no faulty unit remains active in decision making after reconfiguration, and the number of good units isolated during reconfiguration is minimized.

19 Claims, 32 Drawing Sheets

| ROW | COLUMN (1) | COLUMN (0) | MESH POSTION | VECTOR BIT POSTION |
|---|---|---|---|---|
| 0 | 0 | 0 | (0,0) | 0 |
| 0 | 0 | 1 | (0,1) | 1 |
| 0 | 1 | 0 | (0,2) | 2 |
| 1 | 0 | 0 | (1,0) | 3 |
| 1 | 0 | 1 | (1,1) | 4 |
| 1 | 1 | 0 | (1,2) | 5 |

| STEP 1 | MASTER SELF-CHECK | |
|---|---|---|
| MASTER SELF IMPLICATION A. RESULT | | RESPONSE B. |
| 1. SELF-CONSISTENT | | PROCEED TO MEMORY CHANNEL VOTE |
| 2. INCONSISTENT | | ELIMINATE MASTER |

| STEP 2 | MEMORY CHANNEL VOTE | |
|---|---|---|
| MAJORITY DECISION A. | RESPONSE B. | EFFECT ON MINORITY C. |
| 1. AGREE WITH BUS VALUE | TRANSACTION PROCEEDS | ELIMINATE |
| 2. DISAGREE WITH BUS VALUE | TRANSACTION RETRIED | ELIMINATE |
| 3. TIE | ELIMINATE MEMORY CHANNEL | N/A |

*Fig. 14A*

| | INPUTS TO VOTE | | | | | |
|---|---|---|---|---|---|---|
| | A. | B. | C. | D. | E. | F. |
| 1. MASTER | AGREE | AGREE | AGREE | AGREE | AGREE | DISAGREE |
| 2. CHECKER | AGREE | AGREE | DISAGREE | AGREE | DISAGREE | DON'T CARE |
| 3. CHECKER | AGREE | DISAGREE | DISAGREE | | | DON'T CARE |
| 4. RESPONSE | PROCEED | ELIMINATE MINORITY | ELIMINATE MINORITY | PROCEED | ELIMINATE MEMORY CHANNEL | ELIMINATE MASTER |

*Fig. 14B*

| STEP 1 | MASTER SELF-CHECK | |
|---|---|---|
| | RESULT A. | RESPONSE B. |
| 1. | SELF-CONSISTENT | PROCEED TO MASTER/CHECKER VOTE |
| 2. | INCONSISTENT | ELIMINATE MASTER |

| STEP 2 | CPU CHANNEL VOTE | | |
|---|---|---|---|
| | MAJORITY DECISION A. | RESPONSE B. | EFFECT ON MINORITY C. |
| 1. | AGREE WITH BUS VALUE | TRANSACTION PROCEEDS | ELIMINATE |
| 2. | DISAGREE WITH BUS VALUE | TRANSACTION RETRIED | ELIMINATE |
| 3. | TIE | ELIMINATE CPU CHANNEL | N/A |

*Fig. 15A*

| | INPUTS TO VOTE | | | | | |
|---|---|---|---|---|---|---|
| | A. | B. | C. | D. | E. | F. |
| 1. MASTER | AGREE | AGREE | AGREE | AGREE | AGREE | DISAGREE |
| 2. CHECKER | AGREE | AGREE | DISAGREE | AGREE | DISAGREE | DON'T CARE |
| 3. CHECKER | AGREE | DISAGREE | DISAGREE | | | DON'T CARE |
| 4. RESPONSE | PROCEED | ELIMINATE MINORITY | ELIMINATE MINORITY | PROCEED | ELIMINATE CPU CHANNEL | ELIMINATE MASTER |

*Fig. 15B*

| STEP 1 CPU CHANNEL VOTE |
|---|
| MAJORITY DECISION |
| 1. ADDRESSED |
| 2. NOT ADDRESSED |
| 3. TIE |

| STEP 2 | MAJORITY (CPU CHANNEL VOTE) | | |
|---|---|---|---|
| | MAJORITY DECISION A. | RESPONSE B. | EFFECT ON MINORITY C. |
| 1. | ADDRESSED | INITIATE PROPOSED TRANSACTION | ELIMINATE |
| 2. | NOT ADDRESSED | REMAIN IDLE | IGNORE |
| 3. | TIE | SHUTDOWN | N/A |
| 4. | NO ELIGIBLE VOTERS | SHUTDOWN | N/A |

*Fig. 16A*

| NUMBER OF ACTIVE UNITS | | FAULT SYNDROME | | | VOTE RESULT | NEXT STATE | | | COMMENTS |
|---|---|---|---|---|---|---|---|---|---|
| | | FL_2 A. | FL_1 B. | FL_0 C. | D. | S_2 E. | S_1 F. | S_0 G. | |
| 6 | 1. | Y/Y | Y/Y | Y/Y | C | 1/1 | 1/1 | 1/1 | |
| | 2. | N/Y | Y/Y | Y/Y | C | 0/1 | 1/1 | 1/1 | |
| | 3. | N/Y | N/Y | Y/Y | C | 0/1 | 0/1 | 1/1 | |
| | 4. | N/Y | Y/N | Y/Y | C | 0/1 | 1/0 | 1/1 | |
| | 5. | N/N | Y/Y | Y/Y | C | 0/0 | 1/1 | 1/1 | |
| | 6. | N/Y | N/Y | N/Y | S(S:Y⟷N) | 0/0 | 0/0 | 0/0 | |
| | 7. | N/Y | N/Y | Y/N | S(S:Y⟷N) | 0/0 | 0/0 | 0/0 | |
| | 8. | N/N | N/Y | Y/Y | S(S:Y⟷N) | 0/0 | 0/0 | 0/0 | |
| | 9. | Y/N | Y/N | N/N | I | 1/1 | 1/1 | 1/1 | |
| | 10. | Y/N | N/Y | N/N | I | 1/1 | 1/1 | 1/1 | |
| | 11. | Y/Y | N/N | N/N | I | 1/1 | 1/1 | 1/1 | |
| | 12. | Y/N | N/N | N/N | I | 1/1 | 1/1 | 1/1 | |
| | 13. | N/N | N/N | N/N | I | 1/1 | 1/1 | 1/1 | |
| 5 | | Y/Y | Y/Y | Y/ | C | 1/1 | 1/1 | 1/0 | |
| | | N/Y | Y/Y | Y/ | C | 0/1 | 1/1 | 1/0 | |
| | | Y/N | Y/Y | Y/ | C | 1/0 | 1/1 | 1/0 | |
| | | Y/Y | Y/Y | N/ | C | 1/1 | 1/1 | 0/0 | |
| | | N/Y | N/Y | Y/ | C | 0/1 | 0/1 | 1/0 | |
| | | N/Y | Y/N | Y/ | C | 0/1 | 1/0 | 1/0 | |
| | | Y/N | Y/N | Y/ | C | 1/0 | 1/0 | 1/0 | |
| | | N/N | Y/Y | Y/ | C | 0/0 | 1/1 | 1/0 | |
| | | N/Y | Y/Y | N/ | S(S:Y⟷N) | 0/0 | 0/0 | 0/0 | MINORITY |
| | | Y/N | Y/Y | N/ | S(S:Y⟷N) | 0/0 | 0/0 | 0/0 | MINORITY |
| | | Y/N | N/N | Y/ | S(S:Y⟷N) | 0/0 | 0/0 | 0/0 | MINORITY |
| | | N/Y | N/N | Y/ | S(S:Y⟷N) | 0/0 | 0/0 | 0/0 | MINORITY |
| | | Y/Y | N/N | N/ | I | 1/1 | 1/1 | 1/0 | |
| | | N/Y | N/Y | N/ | I | 1/1 | 1/1 | 1/0 | |
| | | Y/N | N/Y | N/ | I | 1/1 | 1/1 | 1/0 | |
| | | Y/N | Y/N | N/ | I | 1/1 | 1/1 | 1/0 | |
| | | N/N | N/N | Y/ | I | 1/1 | 1/1 | 1/0 | |
| | | N/Y | N/N | N/ | I | 1/1 | 1/1 | 1/0 | |
| | | Y/N | N/N | N/ | I | 1/1 | 1/1 | 1/0 | |
| | | N/N | N/N | N/ | I | 1/1 | 1/1 | 1/0 | |

Fig. 16B

| 4 | Y/Y | Y/Y |     | C | 1/1 | 1/1 | 0/0 | |
|---|-----|-----|-----|---|-----|-----|-----|---|
|   | N/Y | Y/Y |     | C | 0/1 | 1/1 | 0/0 | |
|   | N/Y | N/Y |     | S(S:Y⟷N) | 0/0 | 0/0 | 0/0 | |
|   | N/Y | Y/N |     | S(S:Y⟷N) | 0/0 | 0/0 | 0/0 | |
|   | N/N | Y/Y |     | S(S:Y⟷N) | 0/0 | 0/0 | 0/0 | |
|   | Y/Y | Y/  | Y/  | C | 1/1 | 1/0 | 1/0 | |
|   | N/Y | Y/  | Y/  | C | 0/1 | 1/0 | 1/0 | |
|   | Y/N | Y/  | Y/  | C | 1/0 | 1/0 | 1/0 | |
|   | Y/Y | N/  | Y/  | C | 1/1 | 0/0 | 1/0 | |
|   | N/N | Y/  | Y/  | C | 0/0 | 1/0 | 1/0 | TIE BREAKER |
|   | N/Y | N/  | Y/  | S(S:Y⟷N) | 0/0 | 0/0 | 0/0 | |
|   | Y/N | N/  | Y/  | S(S:Y⟷N) | 0/0 | 0/0 | 0/0 | |
|   | Y/Y | /Y  | Y/  | C | 1/1 | 0/1 | 1/0 | |
|   | N/Y | /Y  | Y/  | C | 0/1 | 0/1 | 1/0 | |
|   | Y/Y | /N  | Y/  | C | 1/1 | 0/0 | 1/0 | |
|   | N/N | /Y  | Y/  | C | 0/0 | 0/1 | 1/0 | TIE BREAKER |
|   | N/Y | /N  | Y/  | S(S:Y⟷N) | 0/0 | 0/0 | 0/0 | |
|   | N/Y | /Y  | N/  | S(S:Y⟷N) | 0/0 | 0/0 | 0/0 | |
|   | Y/Y | /N  | N/  | I | 1/1 | 0/1 | 1/0 | TIE BREAKER |
|   | N/N | /Y  | N/  | I | 1/1 | 0/1 | 1/0 | |
|   | Y/N | /N  | N/  | I | 1/1 | 0/1 | 1/0 | |
|   | N/N | /N  | N/  | I | 1/1 | 0/1 | 1/0 | |
|   | Y/Y | N/  | N/  | I | 1/1 | 1/0 | 1/0 | TIE BREAKER |
|   | N/N | Y/  | N/  | I | 1/1 | 1/0 | 1/0 | |
|   | N/Y | N/  | N/  | I | 1/1 | 1/0 | 1/0 | |
|   | Y/N | N/  | N/  | I | 1/1 | 1/0 | 1/0 | |
|   | N/N | N/  | N/  | I | 1/1 | 1/0 | 1/0 | |
|   | Y/N | N/N |     | I | 1/1 | 1/1 | 0/0 | |
|   | N/N | N/N |     | I | 1/1 | 1/1 | 0/0 | |

Fig. 16C

| | | | | | | | | |
|---|---|---|---|---|---|---|---|---|
| 3 | Y/Y | Y/ | | C | 1/1 | 1/0 | 0/0 | |
| | N/Y | Y/ | | C | 0/1 | 1/0 | 0/0 | |
| | Y/N | Y/ | | C | 1/0 | 1/0 | 0/0 | |
| | Y/Y | N/ | | S(S:Y⟷N) | 0/0 | 0/0 | 0/0 | MINORITY |
| | Y/ | Y/ | Y/ | C | 1/0 | 1/0 | 1/0 | |
| | N/ | Y/ | Y/ | C | 0/0 | 1/0 | 1/0 | |
| | /Y | Y/ | Y/ | C | 0/1 | 1/0 | 1/0 | DISJOINT |
| | /N | Y/ | Y/ | C | 0/0 | 1/0 | 1/0 | DISJOINT |
| | /Y | N/ | Y/ | C | 0/1 | 0/0 | 1/0 | DISJOINT |
| | /N | Y/ | N/ | I | 0/1 | 1/0 | 1/0 | DISJOINT |
| | /Y | N/ | N/ | I | 0/1 | 1/0 | 1/0 | DISJOINT |
| | /N | N/ | N/ | I | 0/1 | 1/0 | 1/0 | DISJOINT |
| | Y/ | N/ | N/ | I | 1/0 | 1/0 | 1/0 | |
| | N/ | N/ | N/ | I | 1/0 | 1/0 | 1/0 | |
| | N/Y | N/ | | I | 1/1 | 1/0 | 0/0 | |
| | Y/N | N/ | | I | 1/1 | 1/0 | 0/0 | |
| | N/N | N/ | | I | 1/1 | 1/0 | 0/0 | |
| 2 | Y/Y | | | C | 1/1 | 0/0 | 0/0 | |
| | N/Y | | | S(S:Y⟷N) | 0/0 | 0/0 | 0/0 | |
| | Y/ | Y/ | | C | 1/0 | 1/0 | 0/0 | |
| | N/ | Y/ | | S(S:Y⟷N) | 0/0 | 0/0 | 0/0 | |
| | Y/ | /Y | | C | 1/0 | 0/1 | 0/0 | DISJOINT |
| | N/ | /Y | | S(S:Y⟷N) | 0/0 | 0/0 | 0/0 | DISJOINT |
| | N/ | /N | | I | 1/0 | 0/1 | 0/0 | DISJOINT |
| | N/ | N/ | | I | 1/0 | 1/0 | 0/0 | |
| | N/N | | | I | 1/1 | 0/0 | 0/0 | |
| 1 | Y/ | | | C | 1/0 | 0/0 | 0/0 | |
| | N/ | | | I | 1/0 | 0/0 | 0/0 | |

*Fig. 16D*

NOTATION:

A) FAULT SYNDROME:  FL_2 - FLAG VALUES FOR CPU CHANNEL_2 MIUs
         Y - MIU BELIEVES IT IS BEING ADDRESSED
         N - MIU BELIEVES IT IS NOT BEING ADDRESSED

B) RESULTS:    C - CONTINUE OPERATION
         I - REMAIN IDLE
         S - SHUT DOWN
         S(S:Y⟺N) - SHUT DOWN (THE RESULT WITH ALL Y's AND N's
                SWITCHED WOULD ALSO BE SHUT DOWN)

C) NEXT STATE:  S_2 - DESIRED NEXT STATE FOR CPU CHANNEL_2 MIUs
         1/1 - UNITS IN MEMORY CHANNELS 1 & 0 REMAIN ACTIVE
         1/0 - UNIT IN MEMORY CHANNEL 1 REMAINS ACTIVE,
            UNIT IN MEMORY CHANNEL 0 IS DEAD

*Fig. 16E*

| STEP 1 | CPU CHANNEL VOTE |
|---|---|
| | MAJORITY DECISION |
| 1. | CONSISTENT |
| 2. | INCONSISTENT |
| 3. | TIE |

| STEP 2 | | MAJORITY (CPU CHANNEL VOTE) | |
|---|---|---|---|
| | MAJORITY DECISION<br>A. | RESPONSE<br>B. | EFFECT ON MINORITY<br>C. |
| 1. | CONSISTENT | INITIATE PROPOSED TRANSACTION | ELIMINATE |
| 2. | INCONSISTENT | ASSERT MEMORY EXCEPTION | ELIMINATE |
| 3. | TIE | SHUTDOWN | N/A |

*Fig. 17A*

| NUMBER OF ACTIVE UNITS | | FAULT SYNDROME | | | VOTE RESULT | NEXT STATE | | | COMMENTS |
|---|---|---|---|---|---|---|---|---|---|
| | | FL_2<br>A. | FL_1<br>B. | FL_0<br>C. | D. | S_2<br>E. | S_1<br>F. | S_0<br>G. | |
| 6 | 1. | Y/Y | Y/Y | Y/Y | C(M:Y⟷N) | 1/1 | 1/1 | 1/1 | |
| | 2. | N/Y | Y/Y | Y/Y | C(M:Y⟷N) | 0/1 | 1/1 | 1/1 | |
| | 3. | N/Y | N/Y | Y/Y | C(M:Y⟷N) | 0/1 | 0/1 | 1/1 | |
| | 4. | N/Y | Y/N | Y/Y | C(M:Y⟷N) | 0/1 | 1/0 | 1/1 | |
| | 5. | N/N | Y/Y | Y/Y | C(M:Y⟷N) | 0/0 | 1/1 | 1/1 | |
| | 6. | N/Y | N/Y | N/Y | S(S:Y⟷N) | 0/0 | 0/0 | 0/0 | |
| | 7. | N/Y | N/Y | Y/N | S(S:Y⟷N) | 0/0 | 0/0 | 0/0 | |
| | 8. | N/N | N/Y | Y/Y | S(S:Y⟷N) | 0/0 | 0/0 | 0/0 | |
| 5 | 9. | Y/Y | Y/Y | Y/ | C(M:Y⟷N) | 1/1 | 1/1 | 1/0 | |
| | 10. | N/Y | Y/Y | Y/ | C(M:Y⟷N) | 0/1 | 1/1 | 1/0 | |
| | 11. | Y/N | Y/Y | Y/ | C(M:Y⟷N) | 1/0 | 1/1 | 1/0 | |
| | 12. | Y/Y | Y/Y | N/ | C(M:Y⟷N) | 1/1 | 1/1 | 0/0 | |
| | 13. | N/Y | N/Y | Y/ | C(M:Y⟷N) | 0/1 | 0/1 | 1/0 | |
| | 14. | N/Y | Y/N | Y/ | C(M:Y⟷N) | 0/1 | 1/0 | 1/0 | |
| | 15. | Y/N | Y/N | Y/ | C(M:Y⟷N) | 1/0 | 1/0 | 1/0 | |
| | 16. | N/N | Y/Y | Y/ | C(M:Y⟷N) | 0/0 | 1/1 | 1/0 | |
| | 17. | N/Y | Y/Y | N/ | S(S:Y⟷N) | 0/0 | 0/0 | 0/0 | MINORITY |
| | 18. | Y/N | Y/Y | N/ | S(S:Y⟷N) | 0/0 | 0/0 | 0/0 | MINORITY |

*Fig. 17B*

| | | | | | | | | |
|---|---|---|---|---|---|---|---|---|
| 4 | Y/Y | Y/Y | | C(M:Y⟷N) | 1/1 | 1/1 | 0/0 | |
| | N/Y | Y/Y | | C(M:Y⟷N) | 0/1 | 1/1 | 0/0 | |
| | N/Y | N/Y | | S(S:Y⟷N) | 0/0 | 0/0 | 0/0 | |
| | N/Y | Y/N | | S(S:Y⟷N) | 0/0 | 0/0 | 0/0 | |
| | N/N | Y/Y | | S(S:Y⟷N) | 0/0 | 0/0 | 0/0 | |
| | Y/Y | Y/ | Y/ | C(M:Y⟷N) | 1/1 | 1/0 | 1/0 | |
| | N/Y | Y/ | Y/ | C(M:Y⟷N) | 0/1 | 1/0 | 1/0 | |
| | Y/N | Y/ | Y/ | C(M:Y⟷N) | 1/0 | 1/0 | 1/0 | |
| | Y/Y | N/ | Y/ | C(M:Y⟷N) | 1/1 | 0/0 | 1/0 | |
| | N/N | Y/ | Y/ | C(M:Y⟷N) | 0/0 | 1/0 | 1/0 | TIE BREAKER |
| | N/Y | N/ | Y/ | S(S:Y⟷N) | 0/0 | 0/0 | 0/0 | |
| | Y/N | N/ | Y/ | S(S:Y⟷N) | 0/0 | 0/0 | 0/0 | |
| | Y/Y | /Y | Y/ | C(M:Y⟷N) | 1/1 | 0/1 | 1/0 | |
| | N/Y | /Y | Y/ | C(M:Y⟷N) | 0/1 | 0/1 | 1/0 | |
| | Y/Y | /N | Y/ | C(M:Y⟷N) | 1/1 | 0/0 | 1/0 | |
| | N/N | /Y | Y/ | C(M:Y⟷N) | 0/0 | 0/1 | 1/0 | TIE BREAKER |
| | N/Y | /N | Y/ | S(S:Y⟷N) | 0/0 | 0/0 | 0/0 | |
| | N/Y | /Y | N/ | S(S:Y⟷N) | 0/0 | 0/0 | 0/0 | |
| 3 | Y/Y | Y/ | | C(M:Y⟷N) | 1/1 | 1/0 | 0/0 | |
| | N/Y | Y/ | | C(M:Y⟷N) | 0/1 | 1/0 | 0/0 | |
| | Y/N | Y/ | | C(M:Y⟷N) | 1/0 | 1/0 | 0/0 | |
| | Y/Y | N/ | | S(S:Y⟷N) | 0/0 | 0/0 | 0/0 | MINORITY |
| | Y/ | Y/ | Y/ | C(M:Y⟷N) | 1/0 | 1/0 | 1/0 | |
| | N/ | Y/ | Y/ | C(M:Y⟷N) | 0/0 | 1/0 | 1/0 | |
| | /Y | Y/ | Y/ | C(M:Y⟷N) | 0/1 | 1/0 | 1/0 | DISJOINT |
| | /N | Y/ | Y/ | C(M:Y⟷N) | 0/0 | 1/0 | 1/0 | DISJOINT |
| | /Y | N/ | Y/ | C(M:Y⟷N) | 0/1 | 0/0 | 1/0 | DISJOINT |

*Fig. 17C*

| 2 | Y/Y | | | C(M:Y⟷N) | 1/1 | 0/0 | 0/0 | |
|---|---|---|---|---|---|---|---|---|
| | N/Y | | | S(S:Y⟷N) | 0/0 | 0/0 | 0/0 | |
| | Y/ | Y/ | | C(M:Y⟷N) | 1/0 | 1/0 | 0/0 | |
| | N/ | Y/ | | S(S:Y⟷N) | 0/0 | 0/0 | 0/0 | |
| | Y/ | /Y | | C(M:Y⟷N) | 1/0 | 0/1 | 0/0 | DISJOINT |
| | N/ | /Y | | S(S:Y⟷N) | 0/0 | 0/0 | 0/0 | DISJOINT |
| 1 | Y/ | | | C(M:Y⟷N) | 1/0 | 0/0 | 0/0 | |

NOTATION:

A) FAULT SYNDROME: FLAG VALUES FOR CPU CHANNEL_2 BIUs
   Y - BIU THINKS TRANSACTION IS CONSISTENT
   N - BIU THINKS TRANSACTION IS INCONSISTENT

B) RESULTS: C - CONTINUE OPERATION
   M - INVOKE MEXC
   S - SHUT DOWN
   S(S:Y⟷N) - SHUT DOWN (THE RESULT WITH ALL Y's AND N's
      SWITCHED WOULD ALSO BE SHUT DOWN)

C) NEXT STATE: S_2 - DESIRED NEXT STATE FOR CPU CHANNEL_2 BIUs
   1/1 - UNITS IN MEMORY CHANNELS 1 & 0 REMAIN ACTIVE
   1/0 - UNIT IN MEMORY CHANNEL 1 REMAINS ACTIVE,
      UNIT IN MEMORY CHANNEL 0 IS DEAD

*Fig. 17D*

| STEP 1 | CPU CHANNEL VOTE |
|---|---|
| | MAJORITY DECISION |
| 1. | NULLIFY |
| 2. | CONTINUE |
| 3. | TIE |

| STEP 2 | MAJORITY (CPU CHANNEL VOTE) | |
|---|---|---|
| MAJORITY DECISION A. | IF $BIU_j$ TOOK FOLLOWING ACTION B. | THEN $BIU_j$ WILL C. |
| 1. NULLIFY | NULLIFIED | CONTINUE |
| 2. NULLIFY | CONTINUED | SHUTDOWN |
| 3. CONTINUE | NULLIFIED | SHUTDOWN |
| 4. CONTINUE | CONTINUED | CONTINUE |
| 5. TIE | NULLIFIED/CONTINUED | SHUTDOWN |

*Fig. 18A*

| NUMBER OF ACTIVE UNITS | FAULT SYNDROME | | | VOTE RESULT | NEXT STATE ($BIU_j$) | | COMMENTS |
|---|---|---|---|---|---|---|---|
| | Null_2 A. | Null_1 B. | Null_0 C. | D. | $BIU_j$ VOTED TO NULLIFY E. | $BIU_j$ VOTED TO CONTINUE F. | |
| 6 | 1. N/N | N/N | N/N | N | 1 | X | |
| | 2. C/N | N/N | N/N | N | 1 | 0 | |
| | 3. C/N | C/N | N/N | N | 1 | 0 | |
| | 4. C/N | N/C | N/N | N | 1 | 0 | |
| | 5. C/C | N/N | N/N | N | 1 | 0 | |
| | 6. C/N | C/N | C/N | S(S:N⟷C) | 0 | 0 | |
| | 7. C/N | C/N | N/C | S(S:N⟷C) | 0 | 0 | |
| | 8. C/C | C/N | N/N | S(S:N⟷C) | 0 | 0 | |
| | 9. N/C | N/C | C/C | C | 0 | 1 | |
| | 10. N/C | C/N | C/C | C | 0 | 1 | |
| | 11. N/N | C/C | C/C | C | 0 | 1 | |
| | 12. N/C | C/C | C/C | C | 0 | 1 | |
| | 13. C/C | C/C | C/C | C | X | 1 | |

*Fig. 18B*

| 5 | 1. | N/N | N/N | N/ | N | 1 | X | |
|---|---|---|---|---|---|---|---|---|
| | 2. | C/N | N/N | N/ | N | 1 | 0 | |
| | 3. | N/C | N/N | N/ | N | 1 | 0 | |
| | 4. | N/N | N/N | C/ | N | 1 | 0 | |
| | 5. | C/N | C/N | N/ | N | 1 | 0 | |
| | 6. | C/N | N/C | N/ | N | 1 | 0 | |
| | 7. | N/C | N/C | N/ | N | 1 | 0 | |
| | 8. | C/C | N/N | N/ | N | 1 | 0 | |
| | 9. | C/N | N/N | C/ | S(S:N⟷C) | 0 | 0 | MINORITY |
| | 10. | N/C | N/N | C/ | S(S:N⟷C) | 0 | 0 | MINORITY |
| | 11. | N/C | C/C | N/ | S(S:N⟷C) | 0 | 0 | MINORITY |
| | 12. | C/N | C/C | N/ | S(S:N⟷C) | 0 | 0 | MINORITY |
| | 13. | N/N | C/C | C/ | C | 0 | 1 | |
| | 14. | C/N | C/N | C/ | C | 0 | 1 | |
| | 15. | N/C | C/N | C/ | C | 0 | 1 | |
| | 16. | N/C | N/C | C/ | C | 0 | 1 | |
| | 17. | C/C | C/C | N/ | C | 0 | 1 | |
| | 18. | C/N | C/C | C/ | C | 0 | 1 | |
| | 19. | N/C | C/C | C/ | C | 0 | 1 | |
| | 20. | C/C | C/C | C/ | C | X | 1 | |

*Fig. 18C*

| 4 | N/N | N/N | | N | 1 | X | |
|---|---|---|---|---|---|---|---|
| | C/N | N/N | | N | 1 | | |
| | C/N | C/N | | S(S:N⟷C) | 0 | 0 | |
| | C/N | N/C | | S(S:N⟷C) | 0 | 0 | |
| | C/C | N/N | | S(S:N⟷C) | 0 | 0 | |
| | N/N | N/ | N/ | N | 1 | X | |
| | C/N | N/ | N/ | N | 1 | 0 | |
| | N/C | N/ | N/ | N | 1 | 0 | |
| | N/N | C/ | N/ | N | 1 | 0 | |
| | C/C | N/ | N/ | N | 1 | 0 | TIE BREAKER |
| | C/N | C/ | N/ | S(S:N⟷C) | 0 | 0 | |
| | N/C | C/ | N/ | S(S:N⟷C) | 0 | 0 | |
| | N/N | /N | N/ | N | 1 | 0 | |
| | C/N | /N | N/ | N | 1 | 0 | |
| | N/N | /C | N/ | N | 1 | 0 | |
| | C/C | /N | N/ | N | 1 | 0 | TIE BREAKER |
| | C/N | /C | N/ | S(S:N⟷C) | 0 | 0 | |
| | C/N | /N | C/ | S(S:N⟷C) | 0 | 0 | |
| | N/N | /C | C/ | C | 0 | 1 | TIE BREAKER |
| | C/C | /N | C/ | C | 0 | 1 | |
| | N/C | /C | C/ | C | 0 | 1 | |
| | C/C | /C | C/ | C | 0 | 1 | |
| | N/N | C/ | C/ | C | 0 | 1 | TIE BREAKER |
| | C/C | N/ | C/ | C | 0 | 1 | |
| | C/N | C/ | C/ | C | 0 | 1 | |
| | N/C | C/ | C/ | C | 0 | 1 | |
| | C/C | C/ | C/ | C | X | 1 | |
| | N/C | C/C | | C | 0 | 1 | |
| | C/C | C/C | | C | X | 1 | |

*Fig. 18D*

| | | | | | | | |
|---|---|---|---|---|---|---|---|
| 3 | N/N | N/ | | N | 1 | X | |
| | C/N | N/ | | N | 1 | 0 | |
| | N/C | N/ | | N | 1 | 0 | |
| | N/N | C/ | | S(S:N⟷C) | 0 | 0 | MINORITY |
| | N/ | N/ | N/ | N | 1 | X | |
| | C/ | N/ | N/ | N | 1 | 0 | |
| | /N | N/ | N/ | N | 1 | X | DISJOINT |
| | /C | N/ | N/ | N | 1 | 0 | DISJOINT |
| | /N | C/ | N/ | N | 1 | 0 | DISJOINT |
| | /C | N/ | C/ | C | 0 | 1 | DISJOINT |
| | /N | C/ | C/ | C | 0 | 1 | DISJOINT |
| | /C | C/ | C/ | C | X | 1 | DISJOINT |
| | N/ | C/ | C/ | C | 0 | 1 | |
| | C/ | C/ | C/ | C | X | 1 | |
| | C/N | C/ | | C | 0 | 1 | |
| | N/C | C/ | | C | 0 | 1 | |
| | C/C | C/ | | C | X | 1 | |
| 2 | N/N | | | N | 1 | X | |
| | C/N | | | S(S:N⟷C) | 0 | 0 | |
| | N/ | N/ | | N | 1 | X | |
| | C/ | N/ | | S(S:N⟷C) | 0 | 0 | |
| | N/ | /N | | N | 1 | X | DISJOINT |
| | C/ | /N | | S(S:N⟷C) | 0 | 0 | DISJOINT |
| | C/ | /C | | C | X | 1 | DISJOINT |
| | C/ | C/ | | C | X | 1 | |
| | C/C | | | C | X | 1 | |
| 1 | N/ | | | N | 1 | X | |
| | C/ | | | C | X | 1 | |

*Fig. 18E*

NOTATION:

A) FAULT SYNDROME:    NULL_2 – FLAG VALUES FOR CPU CHANNEL_2 BIUs AS RECV'D BY $BIU_j$
                         N – BIU NULLIFIED TRANSACTION
                         C – BIU CONTINUED WITH TRANSACTION

B) RESULTS:              C – CONTINUE TRANSACTION
                         N – NULLIFY TRANSACTION
                         S – SHUT DOWN
                         S(S:N$\Longleftrightarrow$C) – SHUT DOWN (THE RESULT WITH ALL N's AND C's
                                                SWITCHED WOULD ALSO BE SHUT DOWN)

C) NEXT STATE:        1 – $BIU_j$ REMAINS ACTIVE
                            0 – $BIU_j$ SHUTS DOWN
                            X – SCENERIO NOT POSSIBLE GIVEN NULLIFY FLAG VALUES

*Fig. 18F*

| STEP 1 MEMORY CHANNEL VOTE | |
|---|---|
| | VALUE |
| 1. | ACTIVE |
| 2. | DEAD |
| 3. | TIE (INCLUDES 0-0) |

| STEP 2 | MAJORITY (MEMORY CHANNEL VOTE) | | |
|---|---|---|---|
| | MAJORITY DECISION A. | RESPONSE B. | DEAD REMOVAL C. |
| 1. | ACTIVE | KEEP BIU IN ARRAY | ELIMINATE BIU VOTING DEAD |
| 2. | DEAD | KILL BIU | N/A |
| 3. | TIE | KILL BIU | N/A |

*Fig. 19A*

| NUMBER OF ACTIVE UNITS | | FAULT SYNDROME | | | RESULT | NEXT STATE | | | COMMENTS |
|---|---|---|---|---|---|---|---|---|---|
| | | CON_2 A. | CON_1 B. | CON_0 C. | D. | S_2 A. | S_1 B. | S_0 C. | |
| 6 | 1. | A/A | A/A | A/A | S | 1/1 | 1/1 | 1/1 | |
| | 2. | A/A | D/A | A/A | S | 1/1 | 0/1 | 1/1 | |
| | 3. | A/A | D/A | D/A | K | 0/1 | 1/1 | 1/1 | MINORITY |
| | 4. | A/A | D/A | A/D | S | 1/1 | 0/1 | 1/0 | |
| | 5. | A/A | D/D | A/A | S | 1/1 | 0/0 | 1/1 | |
| | 6. | A/D | D/A | D/A | K | 0/1 | 1/1 | 1/1 | |
| | 7. | A/A | D/A | D/D | K | 0/1 | 1/1 | 1/1 | |
| | 8. | A/A | D/D | D/D | K | 0/1 | 1/1 | 1/1 | |
| | 9. | A/D | D/A | D/D | K | 0/1 | 1/1 | 1/1 | |
| | 10. | A/D | D/D | D/D | K | 0/1 | 1/1 | 1/1 | |
| | 11. | D/X | X/X | X/X | K | 0/X | X/X | X/X | |

*Fig. 19B*

| | | | | | | | | |
|---|---|---|---|---|---|---|---|---|
| 5 | A/A | A/A | A/ | S | 1/1 | 1/1 | 1/0 | |
| | A/A | D/A | A/ | S | 1/1 | 0/1 | 1/0 | |
| | A/A | A/D | A/ | S | 1/1 | 1/0 | 1/0 | |
| | A/A | A/A | D/ | S | 1/1 | 1/1 | 0/0 | |
| | A/A | D/A | D/ | K | 0/1 | 1/1 | 1/0 | MINORITY |
| | A/A | D/D | A/ | S | 1/1 | 0/0 | 1/0 | |
| | A/D | D/A | A/ | S | 1/0 | 0/1 | 1/0 | |
| | A/D | D/D | A/ | K | 0/1 | 1/1 | 1/0 | |
| | A/D | D/A | D/ | K | 0/1 | 1/1 | 1/0 | |
| | A/D | D/D | D/ | K | 0/1 | 1/1 | 1/0 | |
| | D/X | X/X | X/ | K | 0/X | X/X | X/0 | |

| | | | | | | | | |
|---|---|---|---|---|---|---|---|---|
| 4 | A/A | A/A | | S | 1/1 | 1/1 | 0/0 | |
| | A/A | D/A | | S | 1/1 | 0/1 | 0/0 | |
| | A/A | D/D | | K | 0/1 | 1/1 | 0/0 | |
| | A/D | A/D | | K | 0/1 | 1/1 | 0/0 | |
| | A/D | D/A | | K | 0/1 | 1/1 | 0/0 | |
| | A/D | D/D | | K | 0/1 | 1/1 | 0/0 | |
| | D/X | X/X | | K | 0/X | X/X | 0/0 | |
| | A/A | A/ | A/ | S | 1/1 | 1/0 | 1/0 | |
| | A/A | D/ | A/ | S | 1/1 | 0/0 | 1/0 | |
| | A/D | A/ | A/ | K | 0/1 | 1/0 | 1/0 | MINORITY |
| | A/A | D/ | D/ | K | 0/1 | 1/0 | 1/0 | |
| | A/D | D/ | A/ | K | 0/1 | 1/0 | 1/0 | |
| | A/D | D/ | D/ | K | 0/1 | 1/0 | 1/0 | |
| | D/X | X/ | X/ | K | 0/X | X/0 | X/0 | |
| | A/A | /A | A/ | S | 1/1 | 0/1 | 1/0 | |
| | A/A | /A | D/ | S | 1/1 | 0/1 | 0/0 | |
| | A/D | /A | A/ | S | 1/0 | 0/1 | 1/0 | |
| | A/D | /A | D/ | K | 0/1 | 0/1 | 1/0 | |
| | A/D | /D | D/ | K | 0/1 | 0/1 | 1/0 | |
| | D/X | /X | X/ | K | 0/X | 0/X | X/0 | |

*Fig. 19C*

| | | | | | | | | |
|---|---|---|---|---|---|---|---|---|
| 3 | A/A | A/ |  | S | 1/1 | 1/0 | 0/0 | |
| | A/A | D/ |  | S | 1/1 | 0/0 | 0/0 | |
| | A/D | A/ |  | K | 0/1 | 1/0 | 0/0 | MINORITY |
| | A/D | D/ |  | K | 0/1 | 1/0 | 0/0 | |
| | D/X | X/ |  | K | 0/X | X/0 | 0/0 | |
| | A/ | A/ | A/ | S | 1/0 | 1/0 | 1/0 | |
| | A/ | D/ | A/ | S | 1/0 | 0/0 | 1/0 | |
| | A/ | D/ | D/ | K | 0/0 | 1/0 | 1/0 | |
| | D/ | X/ | X/ | K | 0/0 | X/0 | X/0 | |
| | A/ | /A | A/ | S | 1/0 | 0/1 | 1/0 | |
| | A/ | /A | D/ | S | 1/0 | 0/1 | 0/0 | |
| | A/ | /D | A/ | K | 0/0 | 0/1 | 1/0 | MINORITY |
| | A/ | /D | D/ | K | 0/0 | 0/1 | 1/0 | |
| | D/ | /X | X/ | K | 0/0 | 0/X | X/0 | |
| 2 | A/A | | | S | 1/1 | 0/0 | 0/0 | |
| | A/D | | | K | 0/1 | 0/0 | 0/0 | |
| | D/X | | | K | 0/X | 0/0 | 0/0 | |
| | A/ | A/ | | S | 1/0 | 1/0 | 0/0 | |
| | A/ | D/ | | K | 0/0 | 1/0 | 0/0 | |
| | D/ | X/ | | K | 0/0 | X/0 | 0/0 | |
| | A/ | /A | | S | 1/0 | 0/1 | 0/0 | |
| | A/ | /D | | K | 0/0 | 0/1 | 0/0 | |
| | D/ | /X | | K | 0/0 | 0/X | 0/0 | |
| 1 | A/ | | | S | 1/0 | 0/0 | 0/0 | |
| | D/ | | | K | 0/0 | 0/0 | 0/0 | |

*Fig. 19D*

*NOTATION:*

A) FAULT SYNDROME: CON_2 – CONFIGURATION STATUS VALUE FROM CPU CHANNEL_2 BIUs
A – BIU THINKS UPPER LEFTMOST BIU IS ACTIVE
D – BIU THINKS UPPER LEFTMOST BIU IS DEAD
X – DON'T CARE

B) RESULTS: S – LEFTMOST BIU SURVIVES
K – KILL LEFTMOST BIU

C) NEXT STATE: S_2 – DESIRED NEXT STATE FOR CPU CHANNEL_2 BIUs
1/1 – UNITS IN MEMORY CHANNELS 1 & 0 REMAIN ACTIVE
1/0 – UNIT IN MEMORY CHANNEL 1 REMAINS ACTIVE,
UNIT IN MEMORY CHANNEL 0 IS DEAD
X – USED IN EXAMPLE IN WHICH TARGET BIU WAS KILLED BY DEAD
REMOVAL. ACTUAL VALUE WOULD DEPEND UPON FAULT
SYNDROME INPUT ACCORDING TO MESH VOTE RULES.

NOTE: BOLD TYPE ENTRIES IN NEXT STATE COLUMN WERE
REMOVED BY DEAD REMOVAL PROCEDURE

*Fig. 19E*

| A. CASE | B. ALGORITHM |
|---|---|
| 1. DEFAULT MEMORY CHANNEL MASTERS | (0,2) (1,1)<br>A BIU WILL REMAIN MASTER AS LONG AS IT REMAINS ACTIVE |
| 2. WHEN MASTER BIU IS DEACTIVATED | INCREMENT COLUMN POSITION OF PREVIOUS MASTER (MODULE 3) UNTIL AN ACTIVE BIU IS REACHED<br>SEQUENCES:<br>(0,2) -> (0,0) -> (0,1)<br>(1,1) -> (1,2) -> (1,0) |

*Fig. 21*

| A. CASE | B. ALGORITHM |
|---|---|
| 1. DEFAULT CPU CHANNEL MASTERS | (1,0) (0,1) (1,2)<br>A BIU MAY LOSE MASTERSHIP WHILE STILL ACTIVE |
| 2. BOTH BIUs IN CPU CHANNEL ACTIVE | |
| CASE 1)<br>NEITHER BIU IS MEMORY CHANNEL MASTER | DEFAULT CPU CHANNEL MASTER RETAINS MASTERSHIP |
| CASE 2)<br>BOTH BIUs ARE MEMORY CHANNEL MASTER | DEFAULT CPU CHANNEL MASTER RETAINS MASTERSHIP |
| CASE 3)<br>ONE BIU IS MEMORY CHANNEL MASTER | NON MEMORY CHANNEL MASTER BECOMES CPU CHANNEL MASTER |
| 3. ONE BIU IN CPU CHANNEL ACTIVE | ACTIVE BIU IN CPU CHANNEL IS CPU CHANNEL MASTER |

*Fig. 22*

MESH INTERCONNECTED ARRAY IN A FAULT-TOLERANT COMPUTER SYSTEM

FIELD OF THE INVENTION

The present invention generally relates to a fault-tolerant computer system and, more particularly, to improved fault identification and reconfiguration performed in a mesh array computer architecture.

BACKGROUND OF THE INVENTION

Fault-tolerant computing is the art of building computing systems that continue to operate satisfactorily in the presence of faults (i.e. hardware or software failures). For example, large commercial aircraft typically include complex flight control computer systems. To ensure the safety of the passengers in the event of a fault, the avionics systems of such aircraft can include three or more redundant computer systems. The systems process the same data from a common source or redundant data from different sources monitoring the same parameter. Should a fault cause an error in the output of one of the redundant computer systems, the outputs of the other systems that agree are used by the avionics system. The step of selecting data for use in a process from among the outputs of redundant sources is called "voting," which is a form of "fault masking" because the erroneous component is ignored.

Although noise or other transient occurrences can produce one-time disagreements that do not have long term adverse impact on the overall avionics system, continuing disagreements usually indicate a failed component or a break in communications on one of the channels. Accordingly, fault-tolerant systems can be configured to lock out one of the redundant channels if it continues to produce results that differ from the other channels. Reconfiguring a fault-tolerant system in this manner is a form of "dynamic recovery." In another dynamic recovery procedure faulty modules are identified and switched out of the system and are substituted with a system spare. Thereafter, the system instigates roll back, initialization, retry, or restart actions necessary to continue ongoing computations.

One effective fault-tolerant "uni-processor architecture" (multiple processors acting as one processor) that uses fault masking and dynamic recovery is the mesh interconnected array. The mesh interconnected array is a matrix of nodes connecting identical central processing units (CPUs) to identical memory modules. This approach can be represented as multiple identical CPUs horizontally disposed with a CPU bus extending vertically below each CPU. Multiple identical memory modules are vertically disposed with memory buses extending horizontally to intersect the CPU buses at nodes or bus interface units (BIUs). Existing mesh architectures perform fault masking and dynamic recovery by comparing pairs of BIUs. One BIU acts as a voting master and another as a voting checker. The checker is compared with the master and does not actively pass data. This is more commonly known as master-checker pairs and is an effective masking technique in fault-tolerant systems. However, the master-checker relationship relies on strict majority vote rules and ignores the uniqueness of the mesh architecture array. Also, these systems assume fault free voting mechanisms and therefore fail to perform error analysis within the BIU circuitry. Other examples of prior art fault-tolerant architectures are shown in Budde et al. U.S. Pat. Nos. 4,438,494; 4,503,534; and 4,503,535.

SUMMARY OF THE INVENTION

The present invention provides a reliable mesh interconnected array in a fault-tolerant computer system. The system includes multiple central processing units (CPUs), multiple memory units, and bus interface units (BIUs). The BIUs are located at the intersections of multiple vertical CPU buses and multiple horizontal memory buses. The result is a matrix of BIUs. Each BIU contains a transaction controller for transmitting a transaction including at least one of the following: address data, read data, write data, or control data. A mesh bus connects all BIUs within a single array of BIUs. The BIUs comprise an error detector for detecting correctable, retryable and non-retryable errors in the transmitted data of a transaction. An error corrector in each BIU corrects any correctable errors detected. A mesh error reporter in each BIU asserts to all the BIUs via the mesh bus if a retryable or non-retryable error was detected by the error detector. A retry mechanism sends the data back to the error detector a preset number of times if a retryable error remains asserted on the mesh bus. A fault manager isolates and eliminates BIUs with detected errors remaining after operation of the retry mechanism by reconfiguring the active status of each BIU connected on the mesh bus according to the type of remaining detected error(s). A continuation mechanism completes the transaction, if no error(s) remain asserted on the mesh bus.

In accordance with other aspects of this invention, the error detector further comprises a single thread read back mechanism for detecting errors of data written to memory when only a single BIU or a single CPU channel is active.

In accordance with further aspects of this invention, the fault manager within each BIU detects any self-implicating errors, shuts down each BIU that detects an uncorrectable self-implicating error, asserts a message to the mesh bus indicating the functioning status (active or inactive) of each BIU, and reconfigures the status of the BIUs by performing a configuration consistency algorithm.

In accordance with yet other aspects of this invention, the fault management processor within each BIU detects any synchronization errors, asserts a first error message to the mesh bus if a synchronization error was detected, performs a first reconfiguration algorithm if a first error message was asserted on the mesh bus and performs the configuration consistency algorithm.

In accordance with still further aspects of this invention, the fault management processor within each BIU detects any memory bus errors, asserts a second error message to the mesh bus if a memory bus error was detected, performs a second reconfiguration algorithm if a second error message was asserted on the mesh bus and performs the configuration consistency algorithm.

In accordance with yet still other aspects of this invention, the fault management processor within each BIU detects any CPU bus errors, asserts a third error message to the mesh bus if a CPU bus error was detected, performs a third reconfiguration algorithm if a third error message was asserted on the mesh bus and performs the configuration consistency algorithm.

In accordance with other aspects of this invention, the system includes as minimum architecture a CPU, at least one memory unit, and a BIU. The system of the present invention preferably includes multiple CPUs, multiple memory units, and multiple BIUs for greater tolerance of faults. The invention provides for fault identification and reconfiguration in a mesh array architecture that allows for single channel operation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 14a–b, 15a–b, 16a–e, 17a–d, 18a–f and 19a–e are charts illustrating algorithms that perform the reconfiguration;

FIGS. 21 and 22 are charts illustrating mastership assignment performed in the circuitry of FIG. 20.

DETAILED DESCRIPTION OF THE PREFERRED EMBODIMENT

Figure 1:
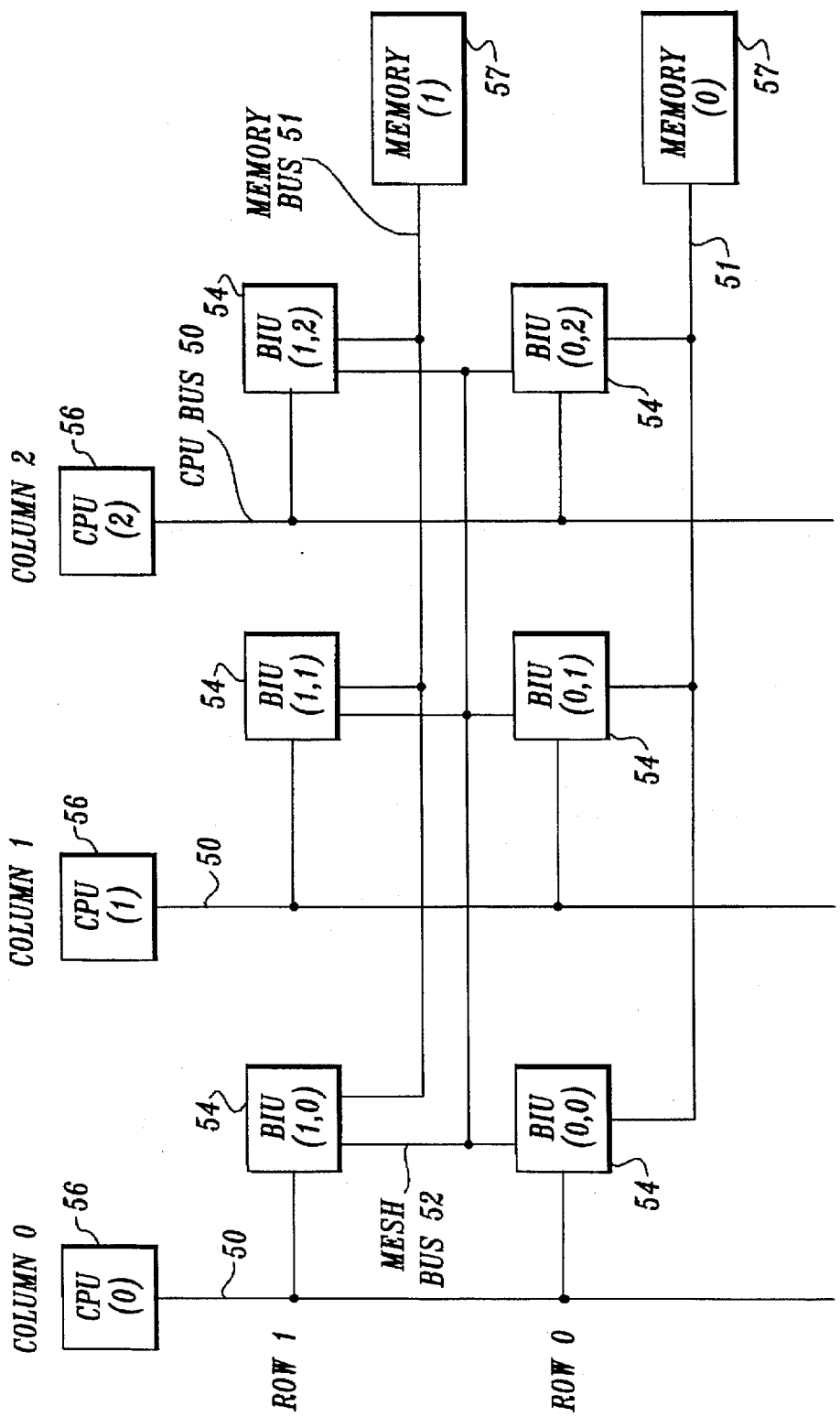
FIG. 1 is a block diagram of a mesh interconnected array in a fault-tolerant computer system in accordance with the present invention using a 2 by 3 matrix of bus interface units (BIUs)
Figures 2, 3:
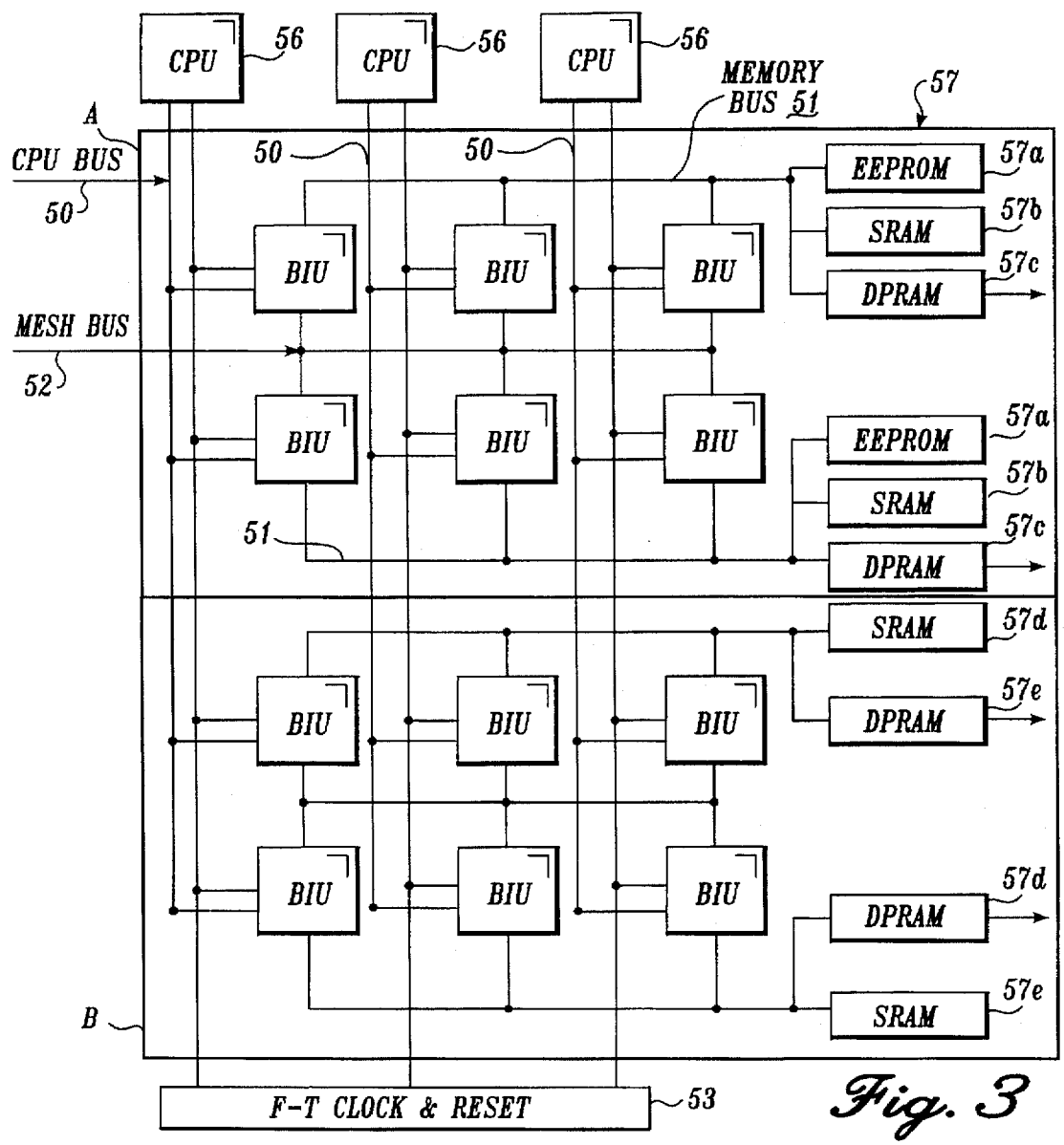
FIG. 2 is a positional assignment chart of the diagram of FIG. 1.
FIG. 3 is a block diagram of a mesh interconnected array in a fault-tolerant computer system in accordance with the present invention using two 2 by 3 matrices of BIUs performing off the same CPUs.

FIG. 1 is a block diagram of a plurality of bus interface units (BIU) 54 at nodes of a fault tolerant matrix (FTM) array in accordance with a preferred embodiment of the present invention. Multiple redundant central processing units (CPUs) 56 have associated CPU buses 50 intersecting memory buses 51. The memory buses extend from redundant memory units 57. In the architecture of FIG. 1, a 2 by 3 matrix consisting of two rows of memory units 57 and three columns of CPUs 56 is used. Each BIU 54 provides a connection or node between a CPU bus 50 and a memory bus 51, i.e., a connection is provided for each column CPU 56 to each row memory unit 57. Each BIU is identified first by the row number of the connected memory unit 57 and then by the column number of the connected CPU 56. All the BIUs 54 in a single FTM are interconnected by a mesh bus 52. As shown in FIG. 2, the location of each BIU 54 has an associated vector bit position which is part of a configuration vector in reconfiguration processing, described in more detail below with reference to FIGS. 19 and 20.

The present invention is capable of operating various configurations, such as a single CPU 56 connected through a single BIU 54 to a single memory unit 57. The present invention also operates effectively if a single CPU is used with multiple redundant memory units, or a single memory channel is used with multiple redundant CPUs. A single CPU channel is identified by a single CPU 56 and CPU bus 50 connected to at least one memory bus 51 with a corresponding memory unit 57. A single memory channel has a single memory bus 51 and memory unit 57 connected to at least one CPU 56. The system is also effective when disjoint BIUs 54 are present. BIUs 54 are disjoint when two or more BIUs 54 fail to occupy the same CPU bus 50 and memory bus 51. The present invention is capable of handling matrix arrays larger than that shown in FIG. 1. However, for the purpose of this description, a 2 by 3 matrix array is effective for showing the redundant capabilities of the present invention. It is also noted that larger matrix arrays provide diminishing improvements in fault tolerant capabilities.

FIG. 3 is a block diagram illustration of two FTM arrays operating from the same set of CPUs 56, but connected to distinct memory systems. A first 2 by 3 mesh, mesh A, has two memory units 57 each consisting of an electrically erasable programmable read-only memory (EEPROM) 57a, a single port random access memory (SRAM) 57b and a dual port random access memory (DPRAM) 57c. The memory rows of a second 2 by 3 mesh B comprise only a SRAM 57d and DPRAM 57e. Mesh B performs distinct yet synchronous operations from the same CPUs 56 that are coupled by mesh A. The CPUs 56 can operate a greater variety of functions with two FTMs connected. However, synchronization between the FTMs is a concern during operation. It can be appreciated by one of ordinary skill in the art that the mesh configuration of the present invention can integrate with various types of memory and input/output (I/O). System data requirements dictate the memory and I/O requirements. One I/O system the present invention can integrate with is an aircraft system integrated modular avionics box, such as an ARINC 629 bus attached to the DPRAMs.

The purpose of the present invention is to effectively deliver or retrieve data from memory in the presence of error(s). During a no error situation, all the BIUs have assigned roles. Each row and column has a BIU assigned a master role and the rest of the BIU(s) of that row or column are assigned checker roles. In a memory write, the master BIU is the only BIU allowed to write data to memory in each memory channel. Each CPU channel has a master BIU for data transactions between the BIUs 54 and the CPUs 56. The checker BIUs are used to check the master BIUs for correctness. Only active BIUs participate in all checking or voting performed in the algorithms of the present invention. When the system is fully functioning, two important inter-related tasks are performed. The first task detects errors internal and external to every BIU in a FTM. The other task is that of reconfiguration of the BIU's status according to the error detection task results. Reconfiguration is performed by a series of algorithms, described below with reference to FIGS. 14–21.

Figure 4:
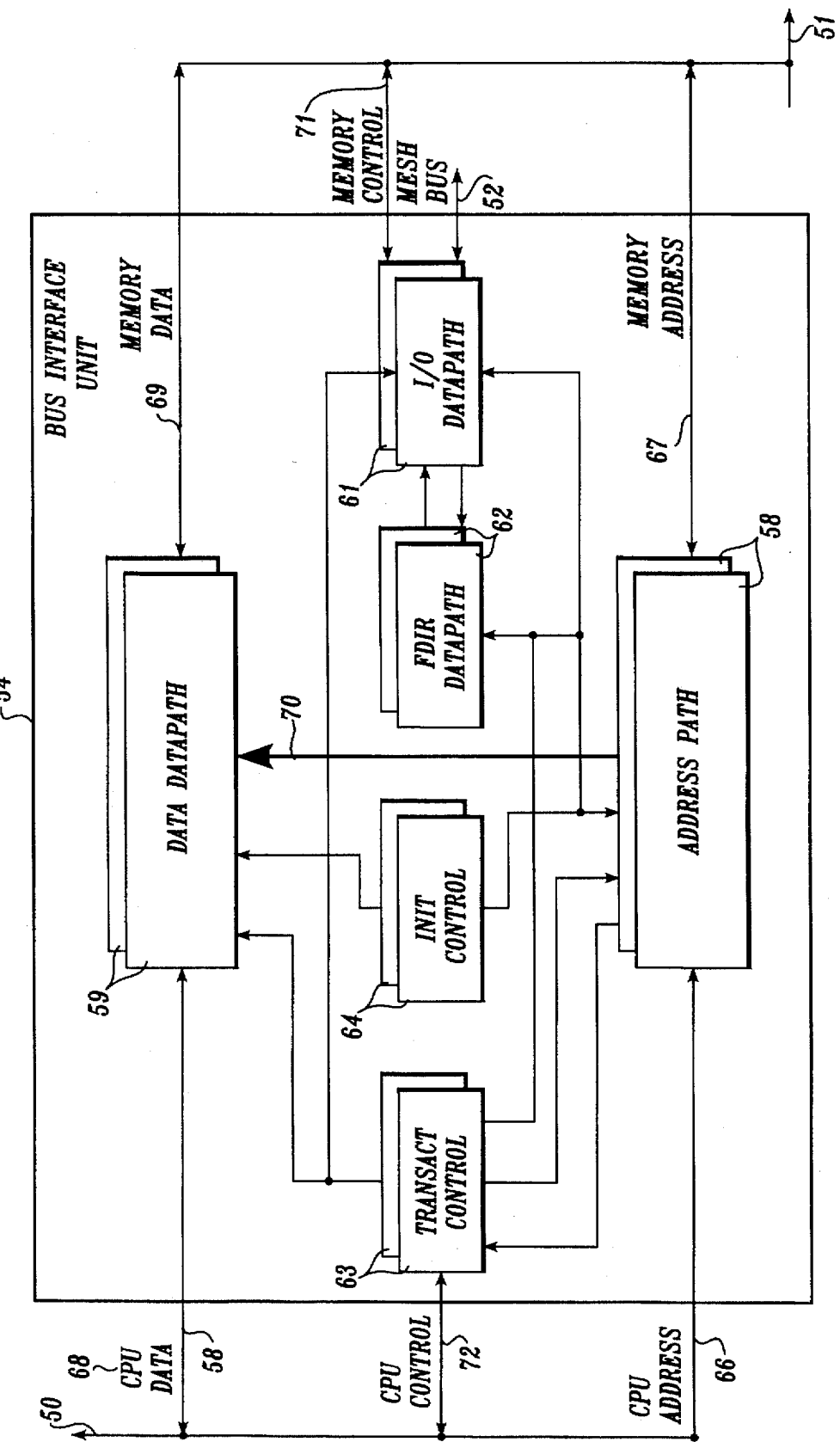
FIG. 4 is a block diagram of the internal components of the BIUs of the configuration of FIG. 1 or FIG. 3.

FIG. 4 is a block diagram of the internal components of a bus interface unit 54 with corresponding bus connections. The bus interface unit 54 includes an address datapath 58, a data datapath 59 and a transaction controller 63 connected there between. An initialization controller 64 also is connected between the address datapath 58 and data datapath 59. A fault identification and reconfiguration (FDIR) datapath 62 interacts with the transaction controller 63 and the initialization controller 64, and an input/output (I/O) controller 61 interacts with all other components of the BIU. Each BIU 54 includes a dual state machine. As shown in FIG. 4, each controller and circuit path 58, 59, 61–64 has dual identical circuitry as illustrated by the shadowed black boxes. The dual state machine includes the dual identical circuits. The dual state machine provides comparison checking of many of the processes performed within the bus interface unit 54.

More specifically, as shown in FIG. 4, the address datapath 58 connects externally to CPU bus 50 (shown at the left) and memory bus 51 (shown at the right). Internally, the address datapath 58 is coupled to transaction controller 63, initialization controller 64, and the data datapath 59. The address datapath 58 receives address data from the CPU bus 50 via a CPU address bus 66 and communicates with the memory bus 51 via a memory address bus 67. The data datapath 59 is internally coupled to transaction controller 63, initialization controller 64 and address datapath 58 (represented by the bold line 70 at the center). The data datapath 59 externally communicates with CPU bus 50 via a CPU data bus 58 and memory bus 51 via a memory data bus 69. Transaction controller 63 receives control data from CPU bus 50 via a CPU control bus 72 and is internally connected to all of the BIU's internal components except the initialization controller 64. Initialization controller 64 has no direct external connections and is internally connected to all of the BIU's components except the transaction controller 63. I/O controller 61 communicates memory control data to and from memory bus 51 via a memory control bus 71 and communicates with the other BIUs in the FTM by the mesh bus 52. Internally, the I/O controller 61 is also connected to the FDIR datapath 62.

Transaction controller 63 determines from CPU control data the transaction that the BIU 54 is to perform and commands each of the components to perform according to the determined transaction. Some examples of transactions are data reads from memory along bus 69, data writes to memory along bus 69, and address accesses of memory along bus 67. The address datapath 58 processes address transactions and the data datapath 59 processes all read and write data transactions. Transaction controller 63 also controls the synchronization of all the components within the BIU 54 thus ensuring efficient processing of all information passing in and through the BIU 54.

Initialization controller 64 provides control of the BIU 54 during startup and any required instruction fetches required during startup.

The FDIR datapath of each BIU 54 within an FTM stores a word (configuration vector) that corresponds to a status value of each BIU within the FTM. The precise storage location is described below with reference to FIG. 20. In a FTM with 6 BIUs the configuration vector is a six-bit word, each bit representing the status of a BIU within the FTM. Referring to FIG. 2, each BIU 54 has a position in the FTM. The position has a corresponding bit in the configuration vector. For example, if the configuration vector was 011101, the BIUs in vector bit position 0, bottom left of FIG. 1, and vector bit position 4, top center of FIG. 1, are considered non-operative because of the zeroes in those respective positions. The considered non-operative BIUs are restricted from FTM operations provided all the BIUs 54 agree with this configuration vector, see below with reference to FIGS. 19–22. The FDIR datapath 62 reconfigures the configuration vector upon identification of faults from the other components within the BIU 54, or according to a change in status of other BIUs received from the mesh bus 52. The reconfiguration algorithm is described below with reference to FIGS. 19 and 20.

Finally, I/O controller 61 provides an interfacing controlling unit with memory bus 51, mesh bus 52 and the internal components connected to the I/O controller 61.

Each BIU 54 in the FTM continuously detects errors of data the BIU 54 receives, processes, and transmits. Two types of detected errors are value errors and synchronization errors. A value error is an error in the data received, processed or transmitted by the BIU 54. A synchronization error arises from inconsistencies in synchronization between the components within a BIU 54, inconsistencies in synchronization between the BIUs within an FTM, and synchronization inconsistencies with a second FTM as shown in FIG. 3. It can be appreciated by one of ordinary skill that any additional units interacting with a FTM must be checked for synchronicity. Performance of dual state machine comparisons, parity checks, complementary signal checks, transaction consistency comparisons, wraparound comparisons of signals sent off the BIU, clock phase comparisons and mesh votes (described below with reference to FIGS. 19 and 20) provide continuous analysis for errors that may occur anywhere in a transaction. Also, the analysis for errors allows each BIU to perform self-implicating error evaluations, thus providing a FTM that can operate with only one active BIU.

The BIUs 54 are preprogrammed to characterize value and synchronization errors in two ways. The errors are first characterized as a BIU self-implicating error, a synchronization consistency error, a memory bus error or a CPU bus error. This identification is later used by the fault management procedure for further isolating the errors (see FIG. 11). Also the errors are evaluated as either correctable, retryable or non-retryable. The second evaluation greatly affects how the fault management procedure reacts to the discovered error (described in more detail below with reference to FIGS. 5 and 20).

Transaction Data Flow

Figure 5:
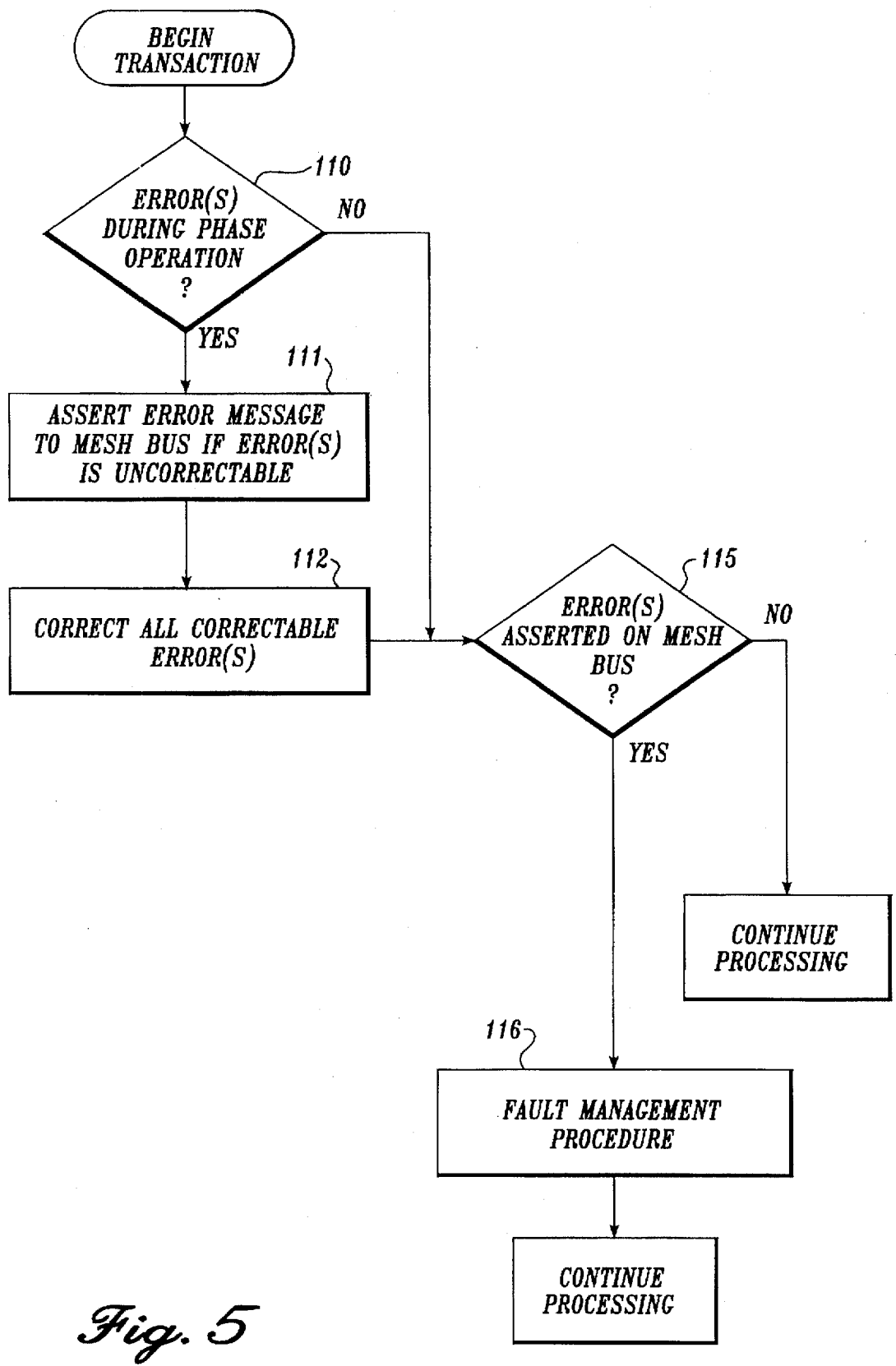
FIGS. 5–13 are flow diagrams illustrating steps performed to achieve mesh reconfiguration in accordance with present invention.
Figure 6:
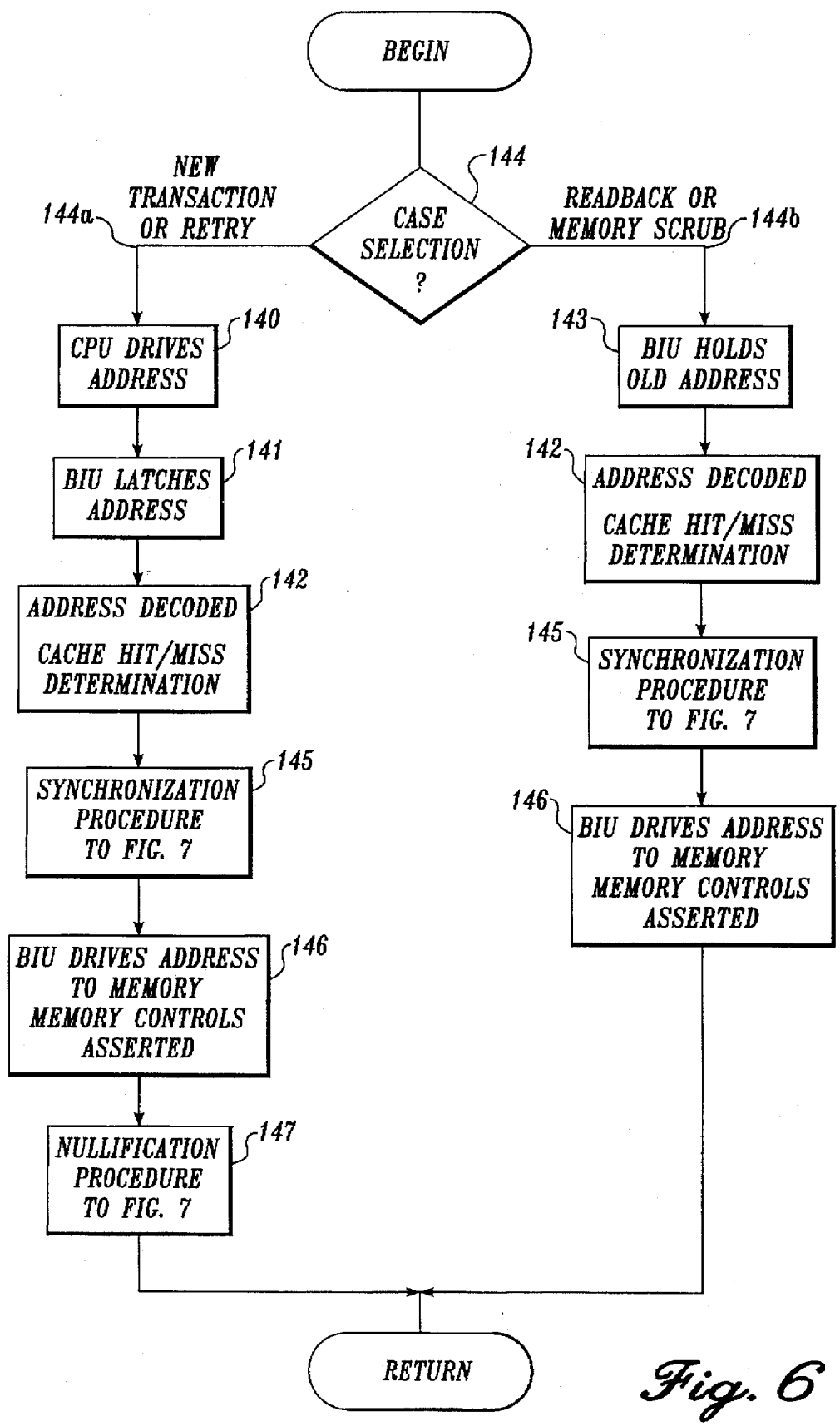
Figure 7:
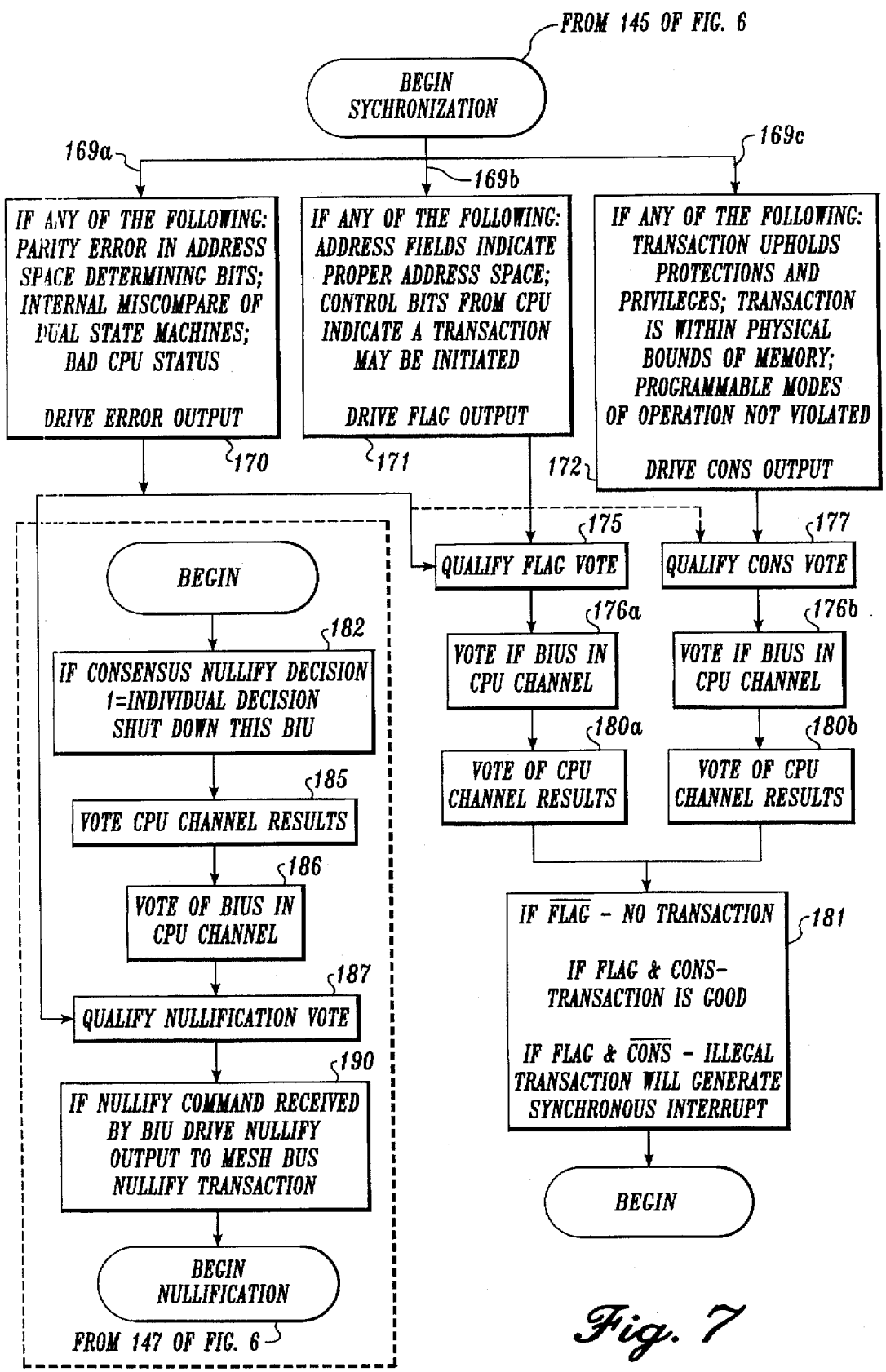
Figure 8:
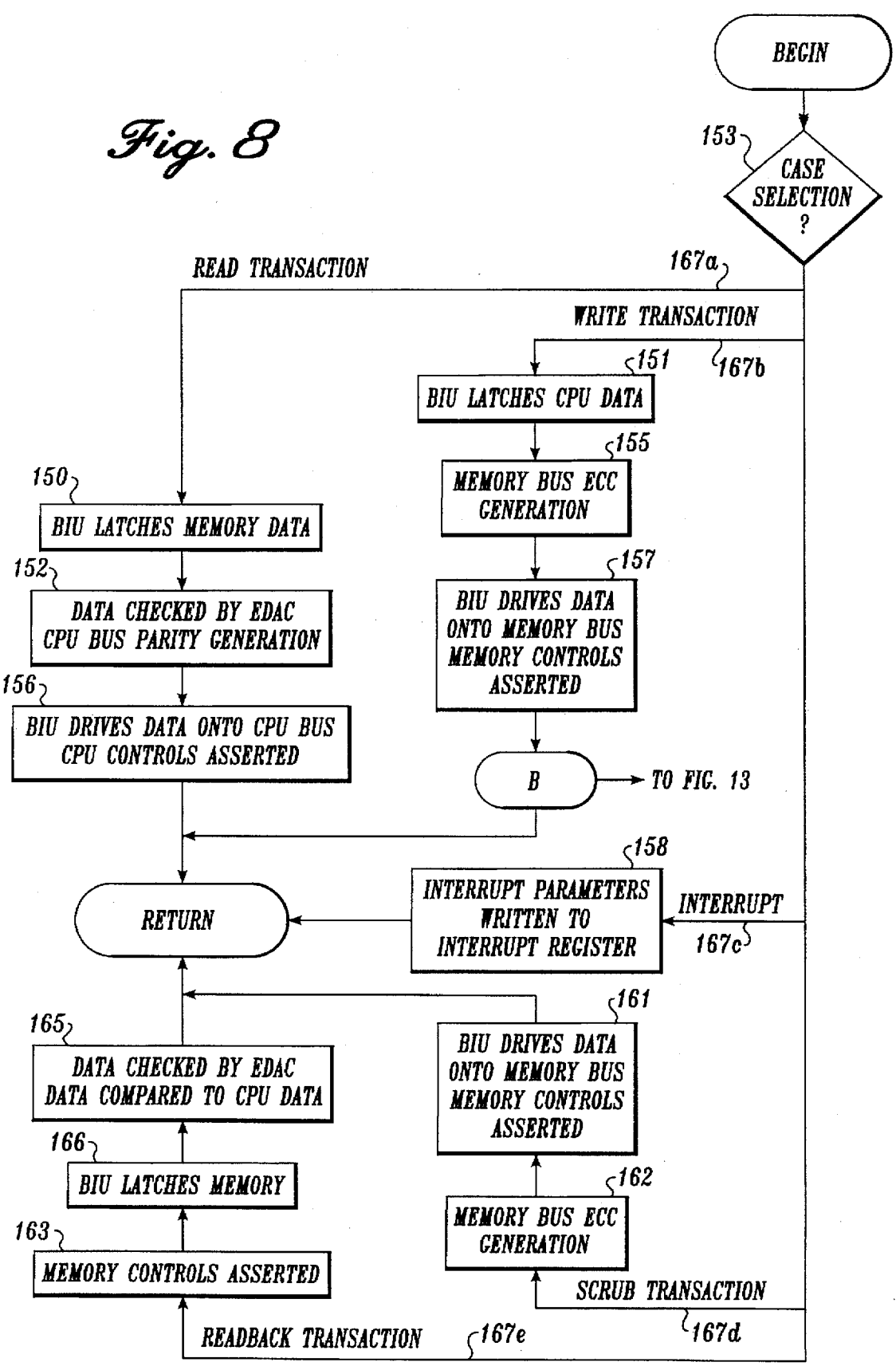

FIGS. 5–13 illustrate the fault-tolerant process of a preferred embodiment of the present invention. All CPU memory transactions are processed through the BIUs 54 and are variations of reads to and writes from memory. As shown in FIG. 5, each transaction received by a BIU 54 is analyzed for errors during phase operation, specifically an address phase and a data phase (110). FIGS. 6 and 8, described below, illustrate the error determining steps performed in the address and the data phases. If the error analysis determines that a retryable or non-retryable error is present in either of the phases, a message indicating so is asserted to the other BIUs via the mesh bus 52 (111) (non-retryable errors are described below with reference to FIG. 11). However, if the error analysis determines that the error present was correctable, the data is corrected (112). If no error was discovered during the phase analysis at 110, or if only correctable errors are present and are corrected at 112, the system proceeds to a decision 115. If at the decision 115 it is determined that no error is asserted on the mesh bus 52, the system proceeds to processing of the next transaction. If an error is asserted on the mesh bus 52, the system proceeds to the fault management procedure 116.

FIG. 6 illustrates the processing steps performed within the address phase of operation. Initially, a case selection 144 is performed on the data received in the address phase. Case selection 144 determines whether the data received is from a new transaction or a retry, branch 144a, or from a readback or a memory scrub, branch 144b. An address phase retry is performed in a retry procedure described below with reference to FIG. 9, and the readback case is described below with reference to FIG. 13. The memory scrub case performs correction of incorrectly stored information determined correctable during a read transaction.

If the case is a new transaction or retry, branch 144a, the CPU drives the address at 140 to the BIU which latches the address at 141. Then the address is decoded and a cache RAM hit/miss determination is performed at 142. In this embodiment cache in the address datapath 58 provides faster access to instructions/data stored in EEPROM. The address phase then performs a synchronization procedure at 145 and a nullification procedure at 147 (both procedures are illustrated in FIG. 7 and described below). Prior to the nullification procedure, the BIU drives the address to memory and memory controls are asserted at 146 onto the memory control bus 71. The address phase analysis of the new transaction or retry, branch 144a, is complete upon completion of the nullification procedure, thus returning any errors determined in the address phase procedure, synchronization procedure or nullification procedure.

If the address phase procedure selects the case of a readback or memory scrub, branch 144b, the address phase procedure performs all of the same tasks as the retry case except the BIU uses the previously held address (143) and the procedure does not perform the nullification procedure.

FIG. 7 illustrates the synchronization procedure at 145 of FIG. 6 and the nullification procedure at 147 that operate within the address phase. The synchronization procedure performs three simultaneous functions shown as paths 169a, b and c. One function, 169a, determines if a synchronization error occurs in the address phase of operation. The other two simultaneous functions, paths 169b and c, drive a FTM address flag if the BIU thinks it is being addressed by the CPU and drives a mesh consistency signal if the BIU believes its address phase operation is consistent with the memory in memory units 57. The driven address flag is qualified with any driven error signals at 175, then passed to the algorithm beginning at 176a and 180a, described below with reference to FIG. 16A. The driven consistency signal is similarly qualified with the error signals at 177 and processed through an algorithm at 176b and 180b, described below with reference to FIG. 17A. In 181, resulting actions are performed on the analysis of data from the beginning of the synchronization process. If no flag signal exists, no transaction will be prosecuted. If an address and a transaction consistency signal exist, then the synchronization process indicates that the transaction is good. However, if a flag is present and no transaction consistency signal is present, the transaction is illegal and will generate a synchronous interrupt signal for further use in the fault management procedure.

The nullification procedure is illustrated with the synchronization procedure, since it uses the same driven error output of 170. The CPU 56 pipelines transactions through BIUs 54 for efficient processing. However, situations may occur when a transaction in the pipeline is not necessary and must be nullified. The nullification procedure provides the FTM with the capabilities of nullifying an unwanted transaction. If a nullification signal is received by the BIU, an output signal is sent to the mesh bus 52 to nullify the transaction at 190. The nullification signal sent to the mesh bus 52 is then qualified by the error signal output of 170 and execution of the nullification algorithm of 185 and 186 is executed. If the consensus of the algorithm is a nullify decision, a non-retryable signal is produced and any disagreeing BIU is shutdown at 182 (non-retryable errors are described below with reference to FIG. 11). The nullification algorithm is described in more detail with reference to FIG. 18. Completion of both the nullification and synchronization procedures returns the processing to the address phase.

The other procedure performed in the error detection test at 110 of FIG. 5 is the data phase procedure, shown in FIG. 8. The data phase procedure includes case selection at 153 for choosing one of five transactions shown as paths 167a–e according to the data received by the data datapath 59: a read transaction 167a; a write transaction 167b; an interrupt transaction 167c; a scrub transaction 167d; a readback transaction 167e. If the case is a read transaction 167a, a data read from memory, the BIU latches the data read from memory at 150, checks it for errors in an error detecting and correcting circuit (EDAC) located within datapath 59 and generates parity at 152, and drives the data onto the CPU bus 50 at 156. If the case determined is a write transaction 167b, a data write to memory, the BIU latches the data from the CPU to be written to memory at 151, generates error correcting code (ECC) at 155 and drives the data received from the CPU onto the memory bus at 157. The write transaction includes a step B that is described in more detail below with FIG. 13. If the transaction is an interrupt 167c, interrupt parameters are written to an interrupt register at 158. The interrupt transaction initiates from errors requiring the FTM and/or BIU to temporarily stop processing. If the case is a scrub transaction 167d, error correcting code (ECC) is generated at 162 and the BIU drives the data to be stored onto the memory bus and asserts memory controls at 161. Finally, if the case is a readback transaction 167c, the memory controls are asserted 163, the BIU latches the data sent to memory at 166, checks the stored data by EDAC and compares that data to the received data from the CPU at 165. The scrub transaction performs corrections of correctable data. Completion of each of the cases within the data phase procedure returns the procedure back to the decision on page 17 at 110 of FIG. 5 with any errors determined by the data se procedure.

Figure 13:
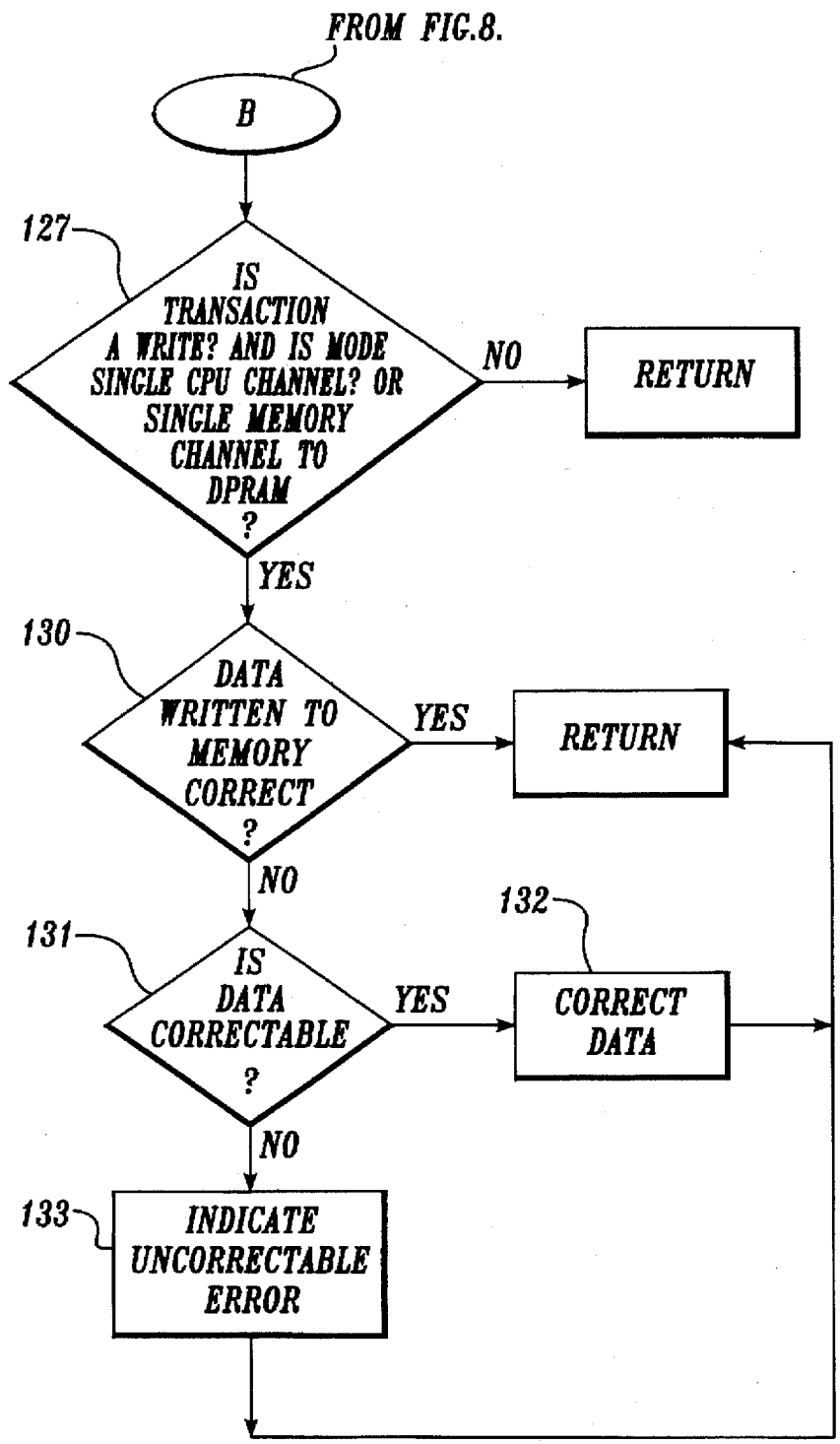

As shown in FIG. 13, a check is performed on the memory stored data of a write transaction during either single CPU channel or single memory channel writing to DPRAM at 127. If the data written to memory is correct, the process returns to phase processing 110 of FIG. 5. If the data is incorrect but correctable (131), the data is corrected (132). However, if the data is incorrect but not correctable, an error is asserted on the mesh bus.

Figure 9:
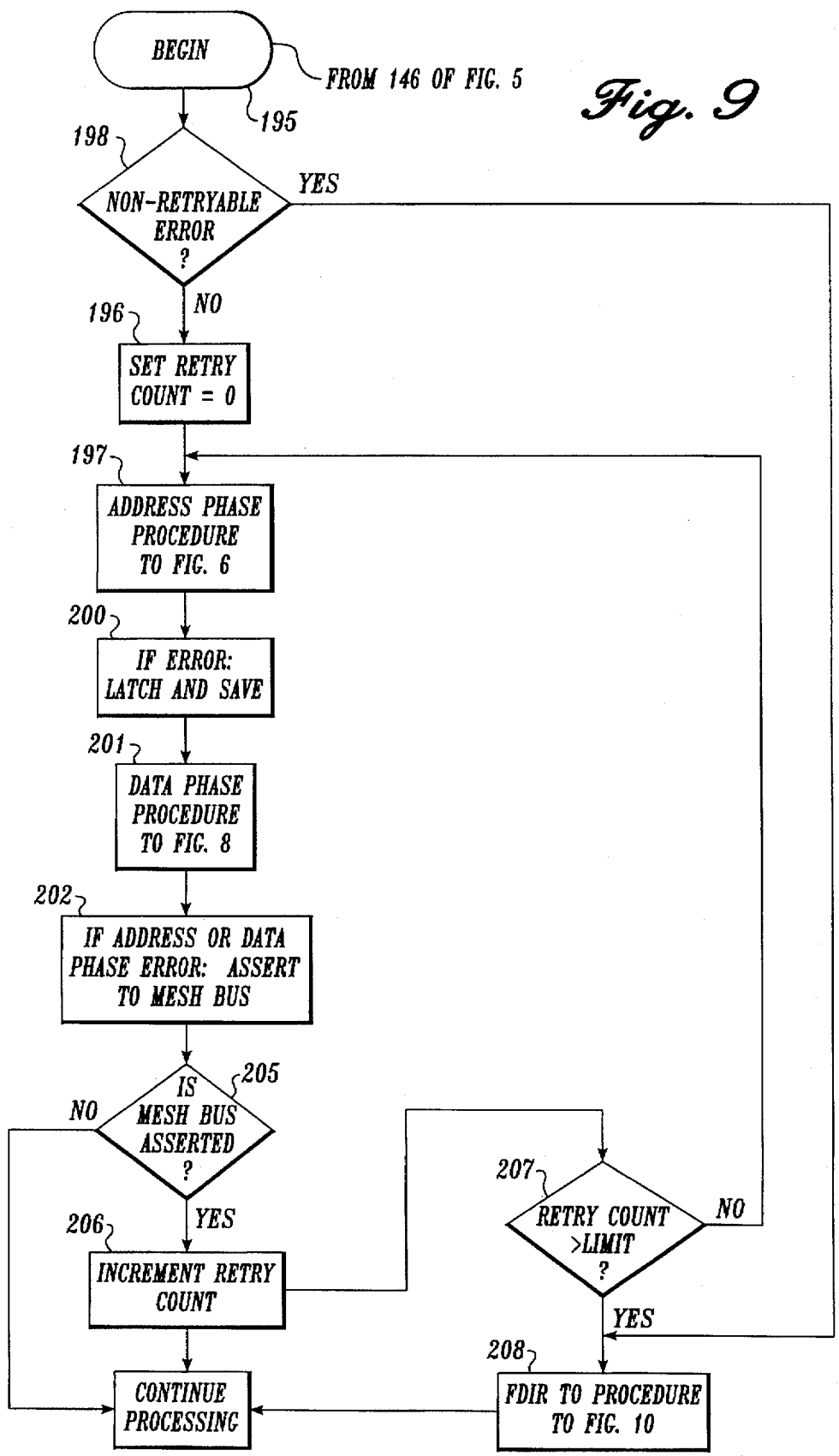

If a retryable or non-retryable error(s) exist after performance of the phase operations, the fault management procedure 116 is initiated, as shown in FIGS. 9–12. At decision 198, the process moves directly to a fault identification and reconfiguration (FDIR) procedure 208, if a non-retryable error was previously discovered. As shown in FIG. 9, the system separately retries the address and data phase procedures at 197–205. At step 200, address phase procedure errors are latched and saved until completion of the data phase procedure. This allows the next transaction to start the address phase procedure when the present transaction starts the data phase procedure. A preset number of retries are performed until no errors are asserted on the mesh bus 52, as determined by a decision at 205, or the retry limit is reached, as determined by decision 207. If the retry purges the retryable error(s), the system proceeds to processing the next transaction. If a fault is still asserted on the mesh bus 52 after reaching the retry limit, the system proceeds to the FDIR procedure 208.

Figure 10:
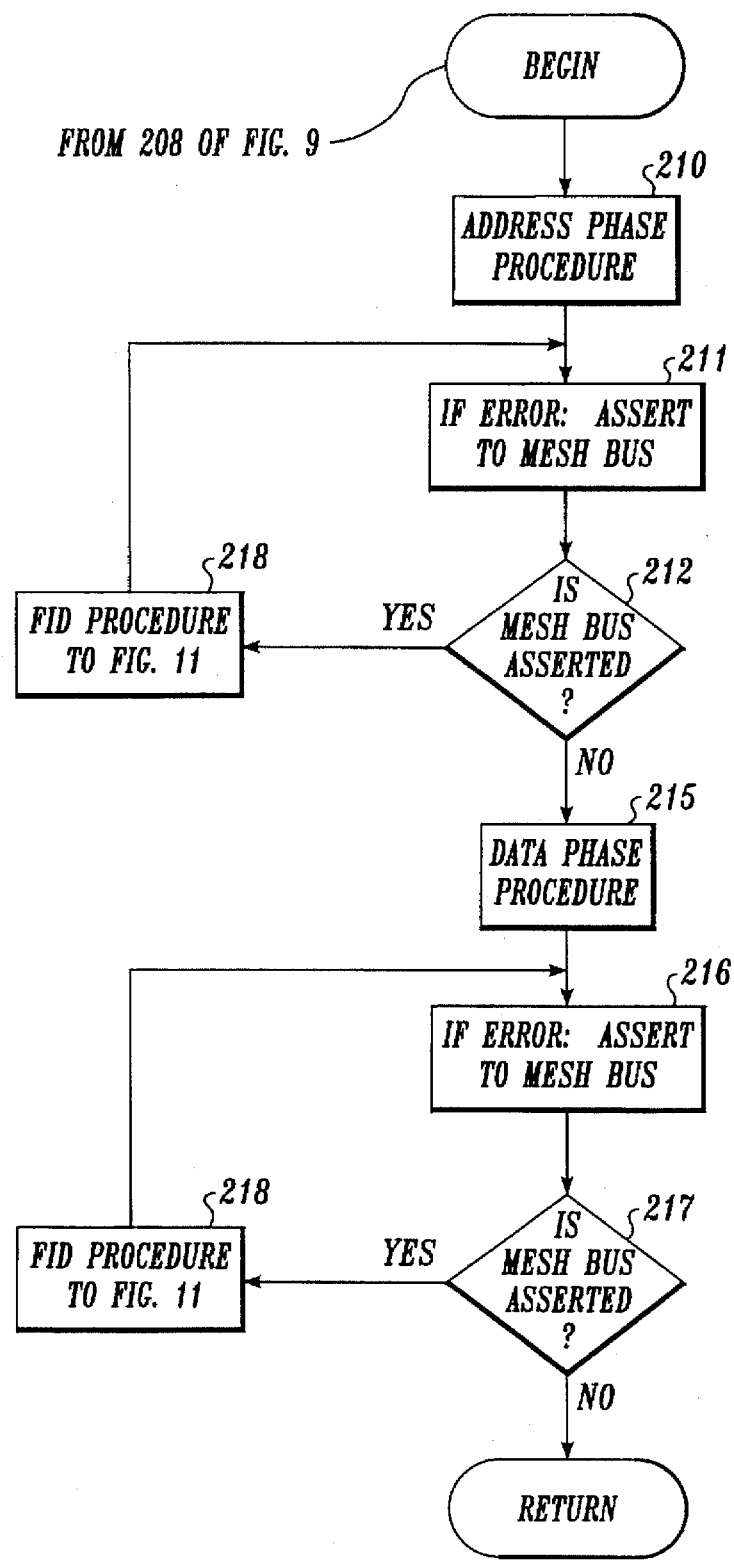

Referring to FIG. 10, the FDIR procedure 208 first checks for address phase errors at 210–212, then data phase errors at 215–217. If an error is detected in either of the phases at 212 and 217, the fault identification (FID) procedure 218 is separately initiated. Essentially at this stage of the procedure any errors present are categorized into one of the two phases, address or data. The FID procedure 218 further isolates any errors, within each phase and reconfigures the mesh configuration vector according to any detected errors.

Figure 11:
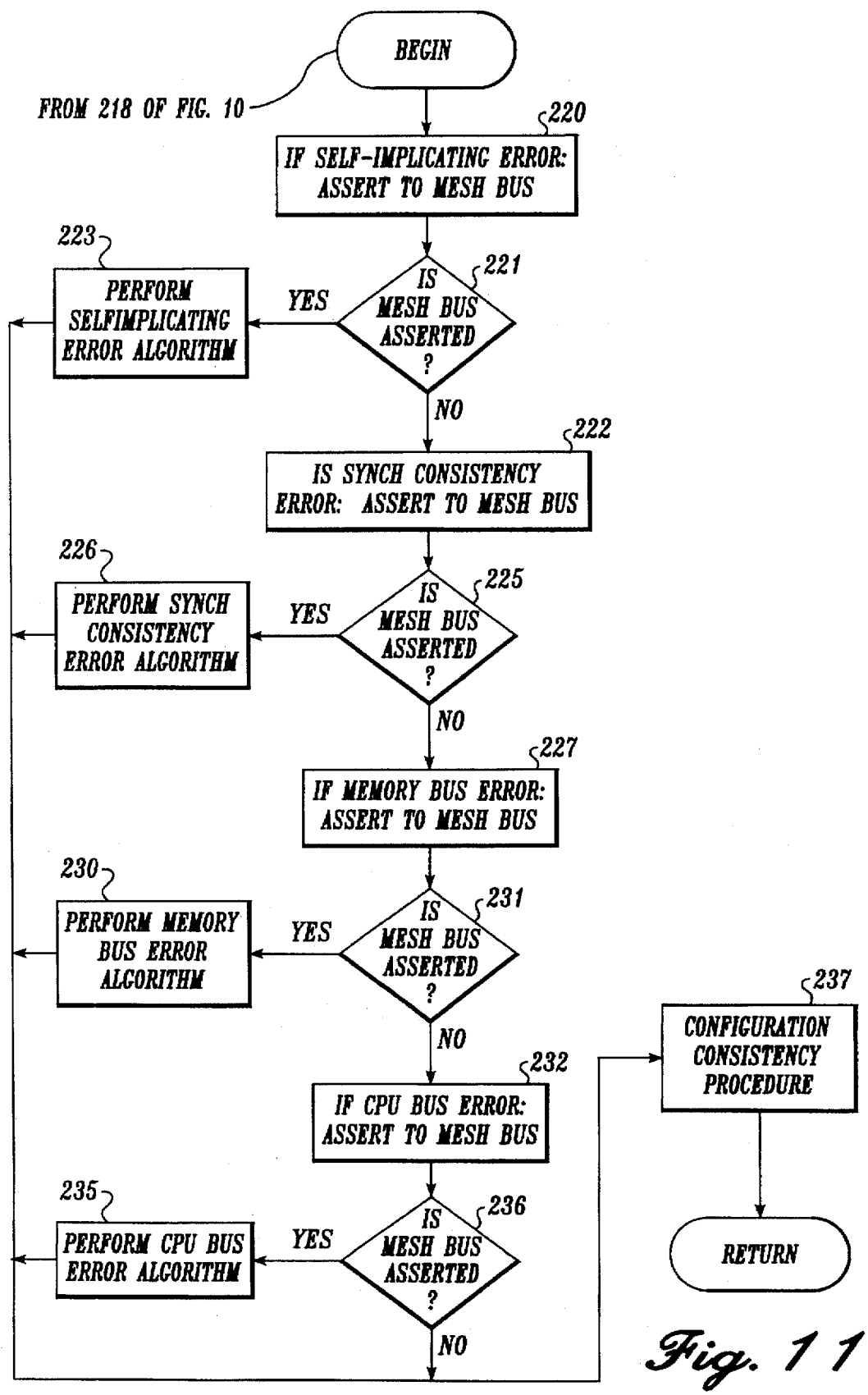

FIG. 11 illustrates the FID procedure 218 that further isolates any errors and reconfigures the configuration vector according to the location of the error(s). Each BIU maintains the n bit configuration vector that indicates the BIU perception of the status of each of the n BIUs in the FTM. For the purpose of the present invention n=6 because there are six BIUs in the 2 by 3 matrix array. The first analysis determines if the error(s) are characterized as self-implicating at 220. If one or more self-implicating errors exist, an error message is asserted on the mesh bus 52 from a decision at 221. All BIUs continuously send a phased heartbeat signal to the BIUs via the mesh bus 52. During fault-free operation the heartbeat signal is continually cycling at a particular cycling phase known to all the BIUs. If the heartbeat signal of a BIU is received out of phase, the BIU is killed or removed from voting. A non-retryable error is an error that causes an erroneous change in the BIU's heartbeat signal. The self-implicated BIU shuts down at 223 and sends a change of its phased heartbeat signal to all the BIUs in the FTM. A phase changed heartbeat signal indicates that the configuration vector will require and must undergo reconfiguration. The individual BIU reaction to a changed heartbeat signal is described below with reference to FIG. 20. A configuration consistency procedure 237 performs any necessary reconfiguration of the configuration vector. The configuration consistency procedure performs a configuration voting algorithm (CVA) and reassigns the master BIUs accordingly, described below with reference to FIGS. 19-22. Once complete, the system returns to the FDIR procedure 208 (FIG. 10) to continue checking for any other errors of the same phase (address or data).

The three other error types are isolated through separate processing passes in the FID procedure. Synchronization consistency errors, memory bus errors, and CPU bus errors are isolated and reconfigured according to predefined algorithms. The synchronous consistency algorithms are described below with reference to FIGS. 18A and 19A. The reconfiguration algorithm for memory bus errors is described below with reference to FIG. 14A. The CPU bus error algorithm is described below with reference to FIG. 15A. After an error is purged by the corresponding algorithm, the configuration consistency procedure (FIG. 12) performs any necessary reconfiguration followed by a return to the FDIR procedure, for further error processing.

Figure 12:
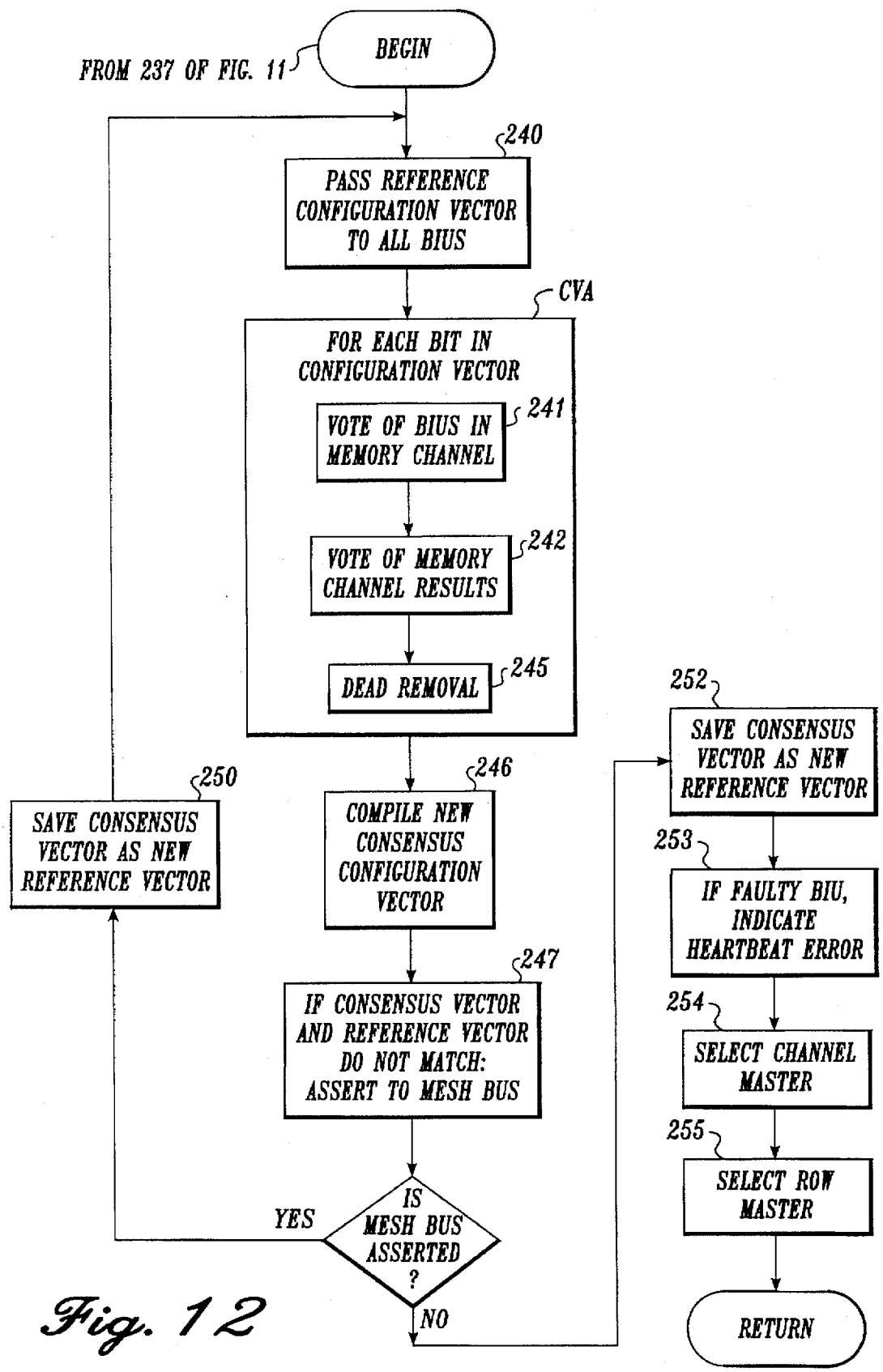

As shown in FIG. 12, each BIU receives, at 240, the configuration vector from all the other BIUs. The CVA then performs a comparison of each bit within the configuration vectors at 241, 242 and 245. First the BIUs in the memory channel vote on a bit in the configuration vector at 241, see below with reference to step 1 of FIG. 19A. Then results of the memory channels' votes are voted on for each bit in the configuration vector at 242 and the BIUs voting dead of a determined active BIU is eliminated at 245, see below with reference to step 2 of FIG. 19A. Upon completion of the CVA, each BIU compiles a new consensus configuration vector at 246 and compares this to a prestored reference configuration vector at 247, see below with reference to FIG. 19 and 20. If no match is found, the mesh bus is asserted with an error and the configuration consistency procedure begins again. If the vectors match, the FID procedure is complete. The consensus vector is saved as new reference vector at 252, a heartbeat error is indicated if a BIU is faulty at 253. Mastership is assigned at 254 and 255 and the process is returned to the FDIR procedure. The steps and circuitry of the configuration consistency procedure are described in more detail below with references to FIGS. 19-22.

As noted, the address phase and data phase procedures are performed prior to 110 of FIG. 5 and during the fault management procedure (at 197, 201, 210 and 215 of FIGS. 9 and 10).

Reconfiguration Algorithms

FIG. 14A illustrates the two step memory bus error algorithm performed at 230 of FIG. 11. In step 1, the memory channel master BIU rechecks for any self-implicating errors, column A.. Elimination of the master row 2, column B occurs if the master self-implicates. If the master does not self-implicate, step 2 initiates row 2, column A. Step 2 is a majority BIU agree or disagree vote of the data the respective channel master placed on the memory bus 51. If the majority decision of the BIUs agree with the memory bus data, the row 1, column A transaction proceeds, row 1, column B, and any disagreeing BIU is eliminated, row 2, column C. If the majority BIU decision disagrees with the master memory bus data, row 2, column A, the transaction is retried, row 2, column B, and the minority BIU is eliminated, row 1, column C. In the case of a tie, row 3, column C, the entire memory channel is eliminated, row 3, column B. FIG. 14B enumerates some configurations and actions. In one example, column B, from FIG. 14B, the memory channel master does not self-implicate itself. The master and one other BIU in the same memory channel agree, rows 1, 2, and the last BIU in the same memory channel disagrees, row 3, with the data the master placed on the memory bus 51. The result is that the transaction proceeds and the disagreeing BIU is eliminated, row 4.

FIG. 15A illustrates the two step CPU bus error algorithm performed at 235 of FIG. 11. Step 1 is similar to step 1 of the memory bus error algorithm of FIG. 14A except the CPU channel's master BIU is the master BIU of interest. Step 2 is a strict majority vote of the data the master CPU channel BIU places on the CPU bus 50. Step 2 is similar to step 2 described in FIG. 14A above.

FIG. 15B enumerates some configurations and corresponding actions. Column E is described below for an example. First, the CPU channel master BIU determines no self-implication exists. The CPU channel master BIU agrees with what it placed on the CPU bus 50, row. Only one other BIU is active in the same CPU channel and this BIU disagrees, row 2, with the data the master BIU placed on the CPU bus 50. With no majority result this CPU channel is eliminated, column 14, and no further transaction processing is performed by this CPU channel.

As shown in FIG. 16A, faults indicated by errors relating to FTM addressing 176a, 180a of FIG. 7 are resolved by a two step majority vote of the BIUs 54 in the FTM. In step 1, the BIUs 54 on each of the CPU channels vote if they think the CPU 56 is addressing the FTM. In step 2, the results from all of the CPU channel votes are voted. Ties in the first step are neutral to the outcome of the second step. Specific error information relating to the FTM address flag and the mesh consistency is placed on the mesh bus 52 to nullify the validity of the flag and mesh consistency of an otherwise active BIU. The results of most cases agree with that of a simple majority. As shown in FIG. 16B, the fault syndrome columns A, B, C represent the CPU columns and each of the two responses in a column represents a voting BIU on a separate memory channel. In the example of row 4, a tie is experienced by the addressing votes of the BIUs in column A, B CPU channels and a consensus yes address vote of the two BIUs in the right CPU channel column C. The resulting majority CPU channel vote is yes, column D. The FTM is being addressed, the transaction is initiated and the BIUs that voted not addressed, top left and bottom center BIU, are eliminated, column E, F. The "Comments" columns for FIGS. 16-19 are reserved for comments regarding the corresponding row results.

Minority case exceptions are noted by "minority" and "tie breaker" in the comment column. For the minority cases, the response is more conservative than a simple majority vote. For the tie breaker case, the FTM remains active because the vote of CPU channel votes gives a majority to one of the possible outcomes even though the absolute number of BIU votes on each side of the question is the same. Note that several resultant configurations are disjoint, such that there may be two single channels with no cross channel data comparisons, although mesh synchronization is still in place.

The voting algorithm 176b, 180b of FIG. 7 and 226 of FIG. 11 is shown in FIG. 17A. In step 1, if the majority CPU channel vote decides that the transaction is inconsistent, row 2, then a memory exception is initiated in step 2, row 2. A tie results in CPU channel shutdown, row 3, and a consistent majority vote initiates the transaction, row 1, and eliminates the minority voting BIUs, row 1. FIGS. 17B–D enumerate the generic configurations and actions with an explanation on notation at the end of the table. The results of most cases agree with that of a simple majority. The exceptions are noted by "minority" and "tie breaker" in the Comment column. For the minority results, the results are more conservative than a simple majority vote. As with the vote procedure of FIG. 16A, disjoint configurations are possible as a result of the vote. One example of the above algorithm is shown in row 18 of FIG. 17B. Five BIUs are able to vote, see columns A–C. As in FIG. 16B, each of columns A–C represents the BIUs connected to the CPU bus and the fractioned row represents a BIU able to vote in one of the two memory buses. Column A vote result is a tie. Column B vote is for a consistent transaction and column C result is for an inconsistent transaction. As a result of the votes above, the CPU channels combined vote is a tie because of the one tie, one consistent and one inconsistent vote. The tie vote results in the FTM shutting down as indicated by column E–G.

As shown in FIGS. 18A–F, the nullification vote of 182, 185, 186 of FIG. 7 differs from the previous two synchronization consistency error algorithms in that the vote takes place after the action has occurred. The decision to nullify or continue, column B of step 2 must be made by each BIU without the benefit of a synchronizing transaction on the mesh bus 52. Therefore, in order to maintain synchronization, a post-action vote is performed and the disagrees immediately shut down, column C, to avoid loss of synchronization, see step 2. This must be done because the nullification/continuation decision results in an irrevocable change of state in the system. Nullification occurs for three reasons: the CPUs 56 assert a nullification signal; the other FTM asserts a hold signal; or self-shutdown of a BIU. Only the first two cases are significant because the third case is self-resolving. A discrepancy in the nullification vote due to either nullification or hold signal assertion, implies either a data error or the loss of synchronization across the CPU channels.

FIG. 18A specifies the two-step fault identification process for the nullification mesh vote. The nullify decision is asserted onto the mesh bus 52 between counts of the clock. In step 1 of FIG. 18A, the BIUs for each CPU channel are voted, generating votes for the CPU channels. In step 2, all of the CPU channel votes from step 1 are voted. If a BIU 54 recognizes that its nullification decision did not match the decision of the mesh vote, then that BIU shuts down column C and broadcasts the shut down by changing its heartbeat signal. The change in the BIU's heartbeat signal is an immediate indication to the FTM that a BIU has killed itself. Surviving BIUs detect the heartbeat change and perform the configuration consistency procedure to generate a new configuration vector. Note that the result of the vote generates only an individual error, not a new FTM configuration. FIGS. 18B–F enumerate some generic configurations and corresponding actions with an explanation on notation at the end of the table. For one example see the row 10 of FIG. 18B. The left and center CPU channels, column A, B, experience a tie of the included BIUs. The right CPU channel vote, column C, is to continue, not nullifying the transaction. Thus, the combined vote of the CPU channels is to continue, column D. The BIUs voting to nullify the continued transaction above are eliminated, column E, because these BIUs disagree with the result.

FIG. 19A illustrates the CVA performed at 241, 242 and 245 of FIG. 12. FIGS. 19B–E enumerate generic configurations and actions with a notation explanation. In step 1, the CVA performs a memory channel vote on each vector bit of the configuration vectors generated by the BIUs 54. In step 2, the memory channel votes are combined to form an intermediate result. The final step, column C is called "dead removal." Dead removal refers to the marking as dead any BIU that voted the subject BIU dead in a vote in which the result had the subject BIU remaining active, row 1, column C. If the combination memory channel vote results in a majority dead decision, row 2, or a tie the BIU is eliminated, row 3.

The results of most cases agree with that of a simple majority. The exceptions are noted by "minority" in the comment column of FIGS. 19B–E. For those exceptions, the present invention is more conservative than a simple majority result and vote as inactive the unit in question. With only two memory channels there are no "tie breaker" cases such as those in the other mesh votes in which the majority of channel votes yields a decision in a case in which the absolute number of BIU votes on each side of the question is the same. Most cases are expected to be unanimous in which case the majority vote is clearly correct. The dead removal procedure is invoked for a small fraction of cases to ensure that whatever caused an inconsistency in configuration vectors to appear across the FTM is removed. Row 10 of FIG. 19B is one example of a result from the CVA. This particular vote is on the left upper-most BIU in the FTM. The result of step 1 is both memory channels voting the BIU dead. Thus, the resulting combined memory channels' vote is dead and therefore removal of the left most BIU, column D, E.

Figure 20:
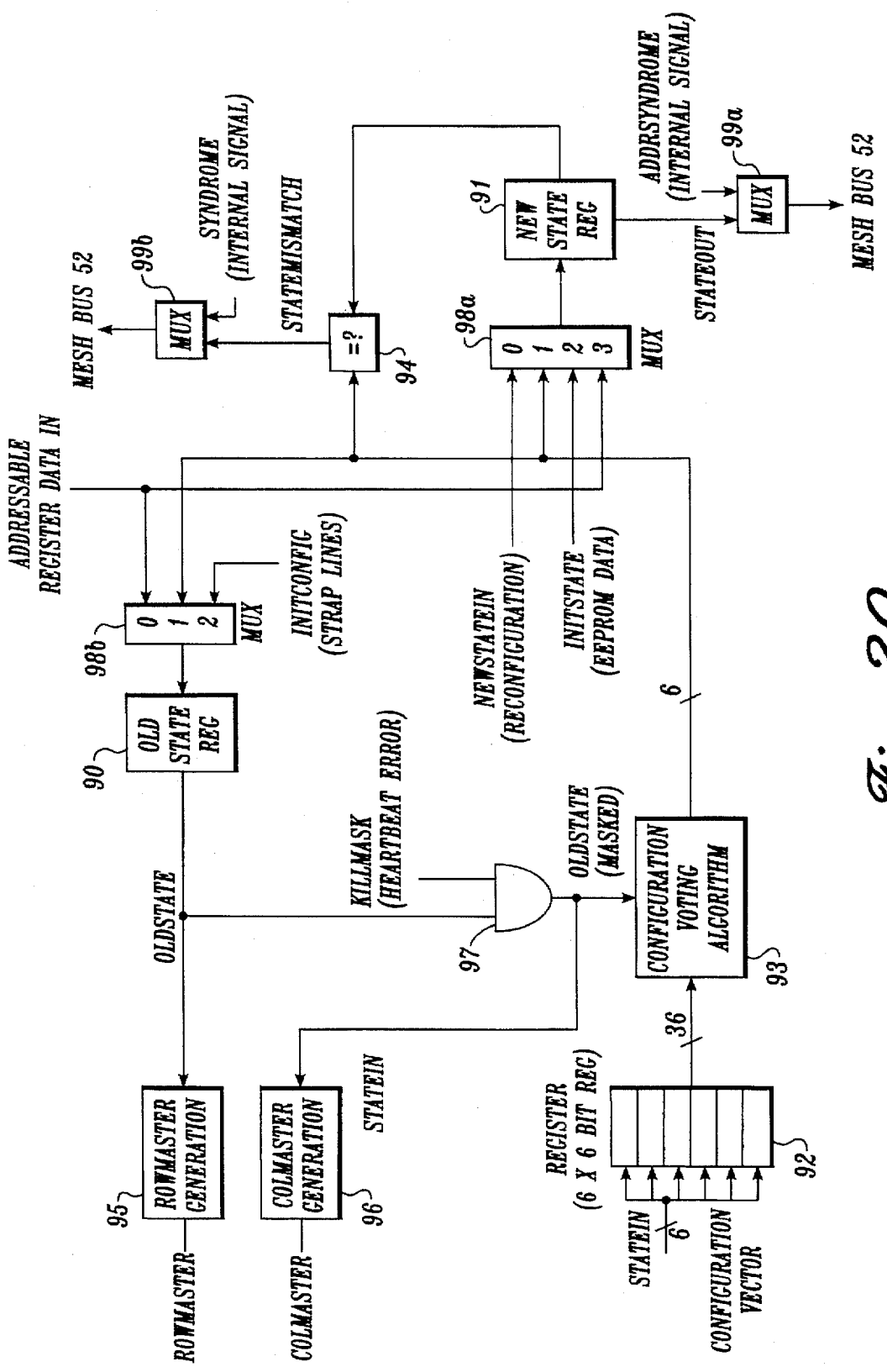
FIG. 20 is a diagram of the configuration consistency check circuitry.

FIG. 20 illustrates the configuration consistency circuitry. The configuration consistency circuitry includes a StateIn register 92 that outputs data to a CVA circuit 93. The output of CVA circuit 93 passes through a multiplexer (MUX)98a to a new state register 91 and through a second MUX 98b to an old state register 90. Also, CVA circuit output and an output of the new state register 91 is received by a StateMismatch comparator 94. Old state register 90 outputs directly to a opti generator 95 and through an AND gate 97 to a columnmaster generator 96. Changed heartbeat signals are also received by AND gate 97 and the output of AND gate 97 is received by the CVA circuit 93. The old state register 90 always stores the current configuration vector. A configuration is implemented by storing the configuration vector into the old state register 90. A killmask marks either a BIU that has a pending, non-retryable error, as signaled by a changed heartbeat signal, or any BIU whose heartbeat is not phased properly. The BIU performs the reconfiguration procedure and generates a new configuration vector, it stores that configuration vector in a new state register 91. The new state register 91 performs a circular shift of the 6 bit configuration vector, asserting it onto a StateOut line and ending the shift with the vector aligned again within the new state register 91. The StateOut line is passed to all BIUs 54 on the mesh bus 52 via a MUX 99a and reenters the circuit at the StateIn register 92.

At this point, each BIU 54 receives at StateIn register 92 a copy of the configuration vectors that each BIU 54 in the FTM has generated and stored in the new state register 91. The CVA, as defined previously in FIG. 19A, is invoked and a new, composite configuration vector is generated from the data in the StateIn register 92 and any possible killed BIUs as received through AND gate 97. If the composite configuration vector matches the contents of the new state register 91, as determined at StateMismatch comparator 94, the process is complete and the new configuration is implemented. If, however, an active BIU has a miscompare at comparator 94 indicating that the composite configuration vector does not match what is stored in its new state register 91, the comparator asserts StateMismatch onto syndrome line of the mesh bus 52 via a MUX 99b. The new composite configuration vector is clocked into state register 91 by MUX 98b, the previous vector stored in a new state register 91 is pushed to the mesh bus 52 and the procedure is repeated until no miscompare exists at comparator 94. At that point, convergence is achieved with The construction of the circuitry of FIG. 20 is driven by the need to handle conditions that may occur during initialization. As shown in FIG. 20, for initialization of the mesh of this invention, the new state register 91 is loaded through MUX 98a with a prestored configuration vector retrieved from the EEPROM and the configuration consistency procedure is invoked using that vector as an initial value. It is possible that the configuration vector retrieved by the BIUs of one memory channel does not match the vector retrieved by the BIUs of other memory channels. Consider the case in which an entire memory channel is shut down during operation. The EEPROM from that memory channel does not have the updated configuration vector stored into it because that channel can no longer respond to transactions. It contains a configuration vector that has some of the BIUs of the inactive channel marked as still active. In the initialization procedure, all BIUs 54 start as active until shown otherwise. Thus, the next time that the system is initialized, the previously deactivated memory channel is active until either individual checks or the configuration consistency procedure illustrate it to be inactive. By weighting the mesh configuration vote to require a clear majority vote of memory channels, the inactive status of the bad memory channel is determined if only one of the memory channels contains the accurate vector indicating that the bad channel should be inactive. Conversely, for a BIU 54 to remain active, the final vote of memory channels must be explicitly positive. A vote by either memory channel to kill a BIU results in the deactivation of that BIU. Therefore, consistency is maintained.

After successful determination of the configuration vector, the assignment of memory channel and CPU channel masters is determined as a function of the configuration vector. In order to avoid bus contention problems, the Mastership status is determined from the old state register 90 contents which should be consistent. The algorithm for determining memory channel Mastership is shown in FIG. 21. When the master memory channel BIU is deactivated, mastership assignment increments column position until an active BIU is reached. Memory channel mastership is simple because memory channel master assignments have priority over CPU channel master assignments.

The rules for determining CPU channel mastership are more complicated because the CPU channel mastership may be passed from a still-active BIU to its column pair in order to avoid the situation in which a BIU is both memory channel and CPU channel master. The algorithm for determining CPU channel mastership is shown in FIG. 22. Three possible cases exist if both BIUs in a CPU channel are active. In case 1 neither BIU is the memory channel master; therefore, the CPU channel master retains mastership. Case 2 has the same result when both BIUs are memory channel masters. In case 3 one BIU is a memory channel master and CPU mastership assignment goes to the nonmemory channel master. When a single BIU is active in the CPU channel, it is the master.

The present invention provides improved fault identification and reconfiguration performed in a mesh array computer architecture because of a number of important factors previously described. This system's ability to categorize errors as to their type and location and to reconfigure the mesh architecture according to the identified errors, are two features that enable the improvements of this invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fault-tolerant computer system, including one or more central processing units (CPUs) each connected to a CPU bus and one or more memory unit each connected to a memory bus, said CPU bus(es) intersecting said memory bus(es), said system further comprising:

bus interface units (BIUs) located at the intersections of the CPU bus(es) and the memory bus(es);

a transaction means for transmitting a transaction comprising at least one of address data, read data, write data, and control data;

a mesh bus for interconnecting predetermined BIUs;

said BIUs further comprising:

a means for storing a configuration vector representing a BIU's knowledge of the operating status of the BIUs connected to the mesh bus;

an error detecting means for detecting correctable, retryable and non-retryable errors in said data of a transaction;

an error correcting means for correcting any detected correctable errors;

an error asserting means for asserting to all the BIUs via the mesh bus if a retryable or non-retryable error(s) was detected by said error detecting means;

a retry means for sending the data back to said error detecting means a preset number of times, if a retryable error remains asserted on the mesh bus;

a fault management means for isolating and eliminating said BIU(s) with any detected error(s) remaining after said retry means by reconfiguring the configuration vector of each BIU connected on the mesh bus according to the type of remaining detected error(s) and generating a consensus configuration vector according to the reconfigured configuration vector of each BIU, said fault management means comprising:

a self-implicating error means within the fault management means of each BIU for detecting self-implicating errors, shutting down each BIU that detects self-implicating error, asserting the configuration vector of each BIU onto the mesh bus, and generating a consensus configuration vector;

a synchronization error means within the fault management means of each BIU for detecting synchronization errors, asserting a first error message to the mesh bus if a synchronization error was detected, performing a first reconfiguration algorithm if a first error message is asserted on the mesh bus and generating a consensus configuration vector according to the results of the first reconfiguration algorithm; and memory bus error means within the fault management means of each BIU for detecting memory bus errors, asserting a second error message to the mesh bus if a memory bus error was detected, performing a second reconfiguration algorithm if a second error message is asserted on the mesh bus and generating a consensus configuration vector according to the results of the second reconfiguration algorithm; and a continuation means for completing the transaction if no error(s) remain asserted on the mesh bus.

2. The fault-tolerant computer system of claim 1, wherein said error detecting means further comprises:

a single thread read back means for detecting errors of data written to memory when only a single CPU channel is active.

3. The fault tolerant computer system of claim 1, wherein said error detecting means further comprises:

a single thread readback means for detecting errors of data written in memory when only disjoint BIUs are active.

4. The fault tolerant computer system according to claim 1, wherein said fault management means comprises:

CPU bus error means within the fault management means of each BIU for detecting CPU bus errors, asserting a third error message to the mesh bus if a CPU bus error was detected, performing a third reconfiguration algorithm if a third error message is asserted on the mesh bus and generating a consensus configuration vector according to the results of the third reconfiguration algorithm.

5. The fault-tolerant computer system according to claim 4, wherein said fault management means transmits data through the error detecting means in the following order:

the self-implicating error means;

the synchronization error means;

the memory bus error means; and the CPU bus error means.

6. The fault tolerant computer system according to claim 1, wherein said fault management means further comprises:

a storing means for storing the consensus configuration vector; and a reconfiguration means for generating a consensus configuration vector, if the consensus configuration vector does not match a previously stored consensus configuration vector.

7. A fault-tolerant computing method, including one or more central processing units (CPUs) each connected to a CPU bus and one or more memory units each connected to a memory bus, each CPU bus intersects each memory bus, said method comprising the steps of:

transmitting a transaction comprising at least one of address data, read data, write data, or control data;

connecting predetermined BIUs by a mesh bus;

detecting within said BIUs correctable, retryable and non-retryable errors in said data of the transaction;

correcting any correctable errors detected;

asserting an error message to all the BIUs via the mesh bus if a retryable or non-retryable error(s) was detected;

generating a configuration vector for each BIU, said configuration vector representing the BIU's knowledge of the operating status of all BIUs connected to the mesh bus;

completing the transaction if no error messages are asserted on the mesh bus;

sending the data back to said error detecting step a preset number of times if a retryable error(s) remains asserted on the mesh bus;

isolating and eliminating within said BIUs any remaining retryable or non-retryable error(s) by reconfiguring the configuration vector of each BIU connected on the mesh bus according to the type of detected error(s) and generating a consensus configuration vector according to the reconfigured configuration vector, said step of isolating and eliminating comprising:

a step of detecting within each BIU self-implicating errors, shutting down each BIU that detects an uncorrectable self-implicating error, and asserting a message to the mesh bus indicating the status of each BIU and a step of performing a configuration consistency algorithm;

a step of detecting within each BIU synchronization errors, asserting a first error message to the mesh bus if a synchronization error was detected, and performing a first reconfiguration algorithm if a first error message is asserted on the mesh bus and a step of performing said configuration consistency algorithm according to the results of the first reconfiguration algorithm; and a step of detecting within each BIU memory bus errors, asserting a second error message to the mesh bus if a memory bus error was detected, and performing a second reconfiguration algorithm if a second error message is asserted on the mesh bus and a step of performing said configuration consistency algorithm according to the results of the second reconfiguration algorithm; and completing the transaction according to the reconfigured configuration vector.

8. The fault-tolerant computing method of claim 7, wherein said step of detecting further comprises the steps of:

reading back said data of the completed transaction if the transaction is a write transaction when only a single CPU channel is active and detecting the read back data for errors.

9. The fault tolerant computing method of claim 7, wherein said step of detecting further comprises the steps of:

reading back said data of the completed transaction if the transaction is a write transaction when only disjoint BIUs are active and detecting the read back data for errors.

10. The fault-tolerant computing method according to claim 7, wherein said step of isolating and eliminating comprises a step of detecting within each BIU for any CPU bus errors, asserting a third error message to the mesh bus if a CPU bus error was detected, and performing a third reconfiguration algorithm if a third error message is asserted on the mesh bus and a step of performing said configuration consistency algorithm according to the results of the third reconfiguration algorithm.

11. The fault-tolerant computing method according to claim 7, further comprising the steps of:

storing the consensus configuration vector; and regenerating a consensus configuration vector, if the consensus configuration vector does not match a previously stored consensus configuration vector.

12. A fault-tolerant computer system, including one or more central processing units (CPUs) each connected to a CPU bus and one or more memory units each connected to a memory bus, said CPU bus(es) intersecting said memory bus(es), said system further comprising:

bus interface units (BIUs) located at the intersections of the CPU bus(es) and the memory bus(es);

a transaction means for transmitting a transaction comprising at least one of address data, read data, write data, and control data;

a mesh bus for interconnecting predetermined BIUs;

said BIUs further comprising:

a means for storing a configuration vector representing a BIU's knowledge of the operating status of the BIUs connected to the mesh bus;

an error detecting means for detecting correctable, retryable and non-retryable errors in said data of a transaction;

an error correcting means for correcting any detected correctable errors;

an error asserting means for asserting to all the BIUs via the mesh bus if a retryable or non-retryable error(s) was detected by said error detecting means;

a retry means for sending the data back to said error detecting means a preset number of times, if a retryable error remains asserted on the mesh bus;

a fault management means for isolating and eliminating said BIU(s) with any detected error(s) remaining after said retry means by reconfiguring the configuration vector of each BIU connected on the mesh bus according to the type of remaining detected error(s) and generating a consensus configuration vector according to the reconfigured configuration vector of each BIU, said fault management means comprising:

a first error means within the fault management means of each BIU for detecting a predetermined first type of error, asserting a first error message to the mesh bus if the first type of error was detected, performing a first reconfiguration algorithm if a first error message is asserted on the mesh bus and generating a consensus configuration vector according to the results of the first reconfiguration algorithm; and a second error means within the fault management means of each BIU for detecting a predetermined second type of error, asserting a second error message to the mesh bus if the second type of error was detected, performing a second reconfiguration algorithm if a second error message is asserted on the mesh bus and generating a consensus configuration vector according to the results of the second reconfiguration algorithm; and a continuation means for completing the transaction if no error(s) remain asserted on the mesh bus.

13. The fault-tolerant computer system according to claim 12, wherein said fault management means comprises a third error means within the fault management means of each BIU for detecting a predetermined third type of error, asserting a third error message to the mesh bus if the third type of error was detected, performing a third reconfiguration algorithm if a third error message is asserted on the mesh bus and generating a consensus configuration vector according to the results of the third reconfiguration algorithm.

14. The fault-tolerant computer system according to claim 12, wherein each of the first and second error means detects errors selected from the group consisting of: self-implicating errors, synchronization errors, memory bus errors, and CPU bus errors.

15. The fault-tolerant computer system according to claim 12, wherein each of the first and second error means detects errors selected from the group consisting of: synchronization errors, memory bus errors and CPU bus errors.

16. A fault-tolerant computing method, including one or more central processing units (CPUs) each connected to a CPU bus and one or more memory units each connected to a memory bus, each CPU bus intersects each memory bus, said method comprising the steps of:

transmitting a transaction comprising at least one of address data, read data, write data, or control data;

connecting predetermined BIUs by a mesh bus;

detecting within said BIUs correctable, retryable and non-retryable errors in said data of the transaction;

correcting any correctable errors detected;

asserting an error message to all the BIUs via the mesh bus if a retryable or non-retryable error(s) was detected;

generating a configuration vector for each BIU, said configuration vector representing the BIU's knowledge of the operating status of all BIUs connected to the mesh bus;

completing the transaction if no error messages are asserted on the mesh bus;

sending the data back to said error detecting step a preset number of times if a retryable error(s) remains asserted on the mesh bus;

isolating and eliminating within said BIUs any remaining retryable or non-retryable error(s) by reconfiguring the configuration vector of each BIU connected on the mesh bus according to the type of detected error(s) and generating a consensus configuration vector according to the reconfigured configuration vector, said step of isolating and eliminating comprising:

a first step of detecting a predetermined first type of error, asserting a first error message to the mesh bus if the first type of error was detected, and performing a first reconfiguration algorithm if the first error message is asserted on the mesh bus and performing a configuration consistency algorithm according to the results of the first reconfiguration algorithm; and a second step of detecting within each BIU a predetermined second type of error, asserting a second error message to the mesh bus if the second type of error was detected, and performing a second reconfiguration algorithm if a second error message is asserted on the mesh bus and performing said configuration consistency algorithm according to the results of the second reconfiguration algorithm; and completing the transaction according to the reconfigured configuration vector.

17. The fault-tolerant computer system according to claim 16, wherein isolating and eliminating step further comprises a third step of detecting within each BIU a predetermined third type of error, asserting a third error message to the mesh bus if the third type of error was detected, performing a third reconfiguration algorithm if a third error message is asserted on the mesh bus and generating a consensus configuration vector according to the results of the third reconfiguration algorithm.

18. The fault-tolerant computing method according to claim 16, wherein each of the first and second error detecting steps detects errors selected from the group consisting of: self-implicating errors, synchronization errors, memory bus errors, and CPU bus errors.

19. The fault-tolerant computing method according to claim 16, wherein each of the first and second error detecting steps detects errors selected from the group consisting of: synchronization errors, memory bus errors and CPU bus errors.

* * * * *

UNITED STATES PATENT AND TRADEMARK OFFICE
CERTIFICATE OF CORRECTION

PATENT NO. : 5,742,753
DATED : April 21, 1998
INVENTOR(S) : A.W. Nordsieck et al.

It is certified that error appears in the above-identified patent and that said Letters Patent is hereby corrected as shown below:

Title Page:

| | | |
|---|---|---|
| [56] Pg. 1, col. 1 | Refs. Cited (U.S. Pats., Item 7) | "1987" should read --1990-- |
| [56] Pg. 1, col. 1 | Refs. Cited (U.S. Pats., Item 9) | "1991" should read --1992-- |
| 14 (Claim 1, | 16 line 3) | "unit" should read --unit(s)-- |
| 15 (Claim 3, | 3 line 3) | "readback" should read --read back-- |
| 18 (Claim 17, | 46 line 2) | after "wherein" insert --the-- |

Signed and Sealed this

First Day of September, 1998

Attest:

BRUCE LEHMAN

Attesting Officer

Commissioner of Patents and Trademarks